United States Patent
Moon et al.

(10) Patent No.: US 10,152,724 B2
(45) Date of Patent: Dec. 11, 2018

(54) TECHNOLOGY OF ASSISTING CONTEXT BASED SERVICE

(71) Applicant: Korea Electronics Technology Institute, Seongnam-si, Gyeonggi-do (KR)

(72) Inventors: Jae Won Moon, Seoul (KR); Tae Beom Lim, Yongin-si (KR); Kyung Won Kim, Seoul (KR); Seung Woo Kum, Yongin-si (KR); Jong Bin Park, Hwaseong-si (KR); Jong Jin Jung, Incheon (KR)

(73) Assignee: Korea Electronics Technology Institute, Seongnam-si (KR)

( * ) Notice: Subject to any disclaimer, the term of this patent is extended or adjusted under 35 U.S.C. 154(b) by 993 days.

(21) Appl. No.: 14/548,601

(22) Filed: Nov. 20, 2014

(65) Prior Publication Data
US 2015/0332337 A1    Nov. 19, 2015

(30) Foreign Application Priority Data

May 14, 2014  (KR) ........................ 10-2014-0057567

(51) Int. Cl.
*G06Q 30/00*    (2012.01)
*G06Q 30/02*    (2012.01)

(52) U.S. Cl.
CPC ......... *G06Q 30/02* (2013.01); *G06Q 30/0269* (2013.01)

(58) Field of Classification Search
None
See application file for complete search history.

(56) References Cited

U.S. PATENT DOCUMENTS

| | | | | |
|---|---|---|---|---|
| 7,885,902 | B1* | 2/2011 | Shoemaker | G06Q 10/10 705/1.1 |
| 8,150,913 | B2* | 4/2012 | Cheah | G06Q 10/06 709/202 |
| 9,639,608 | B2* | 5/2017 | Freeman | H04W 4/21 |
| 2002/0174073 | A1* | 11/2002 | Nordman | G06Q 20/382 705/64 |
| 2003/0061239 | A1* | 3/2003 | Yoon | G06F 17/30017 |

(Continued)

FOREIGN PATENT DOCUMENTS

| KR | 1020120104648 | 9/2012 |
|---|---|---|
| KR | 1020120135285 | 12/2012 |
| KR | 1020140006516 | 1/2014 |

OTHER PUBLICATIONS

Korean Office Action No. 1020140057567; dated May 9, 2015.

*Primary Examiner* — Matthew T Sittner
(74) *Attorney, Agent, or Firm* — Sughrue Mion, PLLC

(57) ABSTRACT

A method of providing a context based service is performed by a user terminal. The method includes: generating a user profile about at least one entity; providing user profile characteristic information obtained or inferred from the user terminal associated with the at least one entity; and controlling to provide a user description generated based on the user profile and the user profile characteristic information to a recommendation engine for a required service if a recommendation of a context based service is required to the at least one entity, the recommendation engine performing a service recommendation according to a situation of the at least one entity.

2 Claims, 4 Drawing Sheets

(56) References Cited

U.S. PATENT DOCUMENTS

| | | | |
|---|---|---|---|
| 2004/0176958 A1* | 9/2004 | Salnnenkaita | H04M 1/72561 704/275 |
| 2004/0220926 A1* | 11/2004 | Lamkin | G06F 17/30017 |
| 2006/0106780 A1* | 5/2006 | Dagan | G06Q 10/107 |
| 2006/0285489 A1* | 12/2006 | Francisco | H04L 12/2859 370/229 |
| 2008/0120659 A1* | 5/2008 | Gastinger | H04N 5/76 725/93 |
| 2008/0260253 A1* | 10/2008 | Miyazaki | G06F 17/30017 382/190 |
| 2009/0089107 A1* | 4/2009 | Angell | G06Q 10/00 705/7.28 |
| 2009/0150791 A1* | 6/2009 | Garcia | G06F 17/30873 715/738 |
| 2009/0158170 A1* | 6/2009 | Narayanan | H04L 67/306 715/753 |
| 2009/0222842 A1* | 9/2009 | Narayanan | G06F 9/542 719/328 |
| 2009/0228211 A1* | 9/2009 | Rasanen | H04W 4/02 702/1 |
| 2010/0114803 A1* | 5/2010 | Moon | G06F 17/30699 706/12 |
| 2010/0257131 A1* | 10/2010 | Kim | G06O 30/02 706/47 |
| 2011/0004580 A1* | 1/2011 | Varghese | G06N 99/005 706/47 |
| 2011/0066507 A1* | 3/2011 | Iyer | G06Q 30/02 705/14.66 |
| 2011/0161838 A1* | 6/2011 | Kang | G06Q 10/06 715/757 |
| 2012/0023157 A1* | 1/2012 | Roth | H04L 67/306 709/203 |
| 2012/0047077 A1* | 2/2012 | Humphrey | G06Q 10/101 705/300 |
| 2012/0089605 A1* | 4/2012 | Bangalore | G06F 17/30976 707/737 |
| 2012/0166308 A1* | 6/2012 | Ahmed | G06Q 20/12 705/26.41 |
| 2012/0302270 A1* | 11/2012 | Sathish | G06Q 30/02 455/500 |
| 2013/0151339 A1* | 6/2013 | Kim | G06F 17/3082 705/14.55 |
| 2013/0268373 A1* | 10/2013 | Grishaver | G06Q 30/02 705/14.67 |
| 2013/0297638 A1* | 11/2013 | Hein | H04N 21/252 707/758 |
| 2014/0240124 A1* | 8/2014 | Bychkov | A61B 5/0026 340/539.12 |
| 2014/0365484 A1* | 12/2014 | Freeman | H04W 4/21 707/736 |
| 2014/0379484 A1* | 12/2014 | Duponchel | G06Q 30/0269 705/14.66 |
| 2015/0074706 A1* | 3/2015 | Hao | H04N 21/812 725/24 |
| 2015/0100374 A1* | 4/2015 | Banjeree | G06Q 30/0201 705/7.29 |
| 2015/0127466 A1* | 5/2015 | Zhu | G06F 8/70 705/14.66 |
| 2015/0187188 A1* | 7/2015 | Raskin | G08B 6/00 340/407.1 |
| 2015/0278696 A1* | 10/2015 | Moon | G06N 5/045 706/46 |
| 2015/0294221 A1* | 10/2015 | Andres Gutierrez | G06Q 30/0261 706/46 |
| 2015/0332337 A1* | 11/2015 | Moon | G06Q 30/0269 705/14.66 |
| 2015/0339363 A1* | 11/2015 | Moldoveanu | G16H 50/20 707/723 |

* cited by examiner

TECHNOLOGY OF ASSISTING CONTEXT BASED SERVICE

CROSS-REFERENCE TO RELATED APPLICATION

This application claims priority from Korean Patent Application No. 10-2014-0057567, filed on May 14, 2014, the disclosure of which is incorporated herein in its entirety by reference.

BACKGROUND OF THE INVENTION

1. Field

Methods consistent with exemplary embodiment relate to a context based service, more particularly to a method for determining a context based service, a method for receiving the same, a method of assisting a context based service and a method of providing the context based service using a user description for a service recommendation.

2. Description of the Related Art

An information flood as big data requires a recommendation system for a user's quick and wise choice. This recommendation system may be used to provide a news service or a video service to a targeted user.

If such recommendation system is independently built through a service provider's interface, a third party's free competition for a recommended service provision may be prevented. For example, if a recommendation system is independently built by a television (TV) production company or a TV program provider, a user may not receive a recommended service through a third party's recommended service but may receive a TV program recommendation intended by the TV production company or the TV program provider.

Korean Patent Publication No. 10-2009-0003375 relates to a method for generating contents suitable for a current situation of a mobile communications terminal in order to improve the reliability and satisfaction contents being provided to share a special condition of the mobile communication terminal by sharing the special condition with other users.

According to Korean Patent Publication No. 10-2013-0009922, a situation recognition user feeling interest model is provided to supply user experience which is not supplied in a social network service (SNS) by supplying an optimum recommendation through the situation recognition user feeling interest model.

SUMMARY

One or more exemplary embodiments of the inventive concept provide a context based service technology capable of using a user description for a service recommendation.

One or more exemplary embodiments of the inventive concept provide a context based service technology capable of receiving a service recommendation through a user description generated based on a user profile and user profile characteristic information.

One or more exemplary embodiments of the inventive concept provide a context based service technology capable of defining a user profile for various type entities to perform a service recommendation for a corresponding service.

One or more exemplary embodiments of the inventive concept provide a context based service technology capable of defining various user profile characteristic information to perform a service recommendation for a corresponding service.

In some embodiments, there is provided a method of providing a context based service performed by a user terminal. The method may include: generating a user profile about at least one entity; providing user profile characteristic information obtained or inferred from the user terminal associated with the at least one entity; and controlling to provide a user description generated based on the user profile and the user profile characteristic information to a recommendation engine for a required service if a recommendation of a context based service is required to the at least one entity, the recommendation engine performing a service recommendation according to a situation of the at least one entity.

In one embodiment, the at least one entity may include a plurality of entities, and the generating the user profile may include generating a corresponding user profile through an user terminal associated with other entity in the plurality of entities or external entity except for the plurality of entities.

In one embodiment, the at least one entity may include a plurality of entities, and the generating the user profile may include generating a group profile comprising a user reference defined through users respectively defining the plurality of entities and a Uniform Resource Identifier (URI) as the user profile.

In one embodiment, the providing the user profile characteristic information may include providing a user usage history representing an action history on a specific domain for the at least one entity, and the action history comprises at least one of a content usage history, a website usage pattern and a purchase record.

In one embodiment, the providing the user profile characteristic information may include providing a user preference including content consumption information by the at least one entity, and the content consumption information may include a record of filtering, searching or reading a content.

In one embodiment, the providing the user preference may include providing a user preference level being represented as a weight or priority for a specific service.

In one embodiment, the providing the user profile characteristic information may include providing selectively at least one of an audio presentation preference related to an audio play, a display presentation preference related to an image display and a graphic presentation preference related to a graphic media expression according to the required service.

In one embodiment, the providing the user profile characteristic information may include providing a user emotion included in an emotion word set and generated based on input data input by the at least one entity or inference data inferred through sensing by the user terminal.

In one embodiment, the providing the user profile characteristic information may include providing a user emotion group comprising a user emotion status of the at least one entity generated during a specific period.

In one embodiment, the user emotion group may include a user emotion source including at least one of a trigger source describing a cause inducing the user emotion status and an emotion detection source describing a modality generating the user emotion status.

In one embodiment, the method may further include automatically updating user information for the user description to provide the updated user information to the recommendation engine.

In some embodiments, there is provided a method of assisting a context based service performed on a user description manager being connected with a user terminal. The method may include: generating a user profile about at least one entity through the user terminal, providing user profile characteristic information being obtained or inferred from the user terminal associated with the at least one entity and generating a user description based on the user profile and the user profile characteristic information to provide the user description to a recommendation engine performing a service recommendation according to a situation of the at least one entity for a required service when a recommendation of a context based service is required for the at least one entity.

In some embodiments, there is a method of assisting a context based service performed on a user description manager being connected with a user terminal and a user description manager. The method may include: receiving a user description generated by the user description manager based on a user profile and user profile characteristic information if a recommendation of a context based service is required for at least one entity, the user profile being generated with respect to the at least one entity through the user terminal and the user profile characteristic information being obtained or inferred from the user terminal associated with the at least one entity; and performing a service recommendation according to a situation of the at least one entity for a service required based on the user description.

The context based service technology and related technologies according to an exemplary embodiment may use a user description for a service recommendation.

The context based service technology and related technologies according to an exemplary embodiment may receive a service recommendation through a user description generated based on a user profile and user profile characteristic information.

The context based service technology and related technologies according to an exemplary embodiment may define a user profile for various type entities to perform a service recommendation for a corresponding service.

The context based service technology and related technologies according to an exemplary embodiment may define various user profile characteristic information to perform a service recommendation for a corresponding service.

DETAILED DESCRIPTION OF THE EXEMPLARY EMBODIMENTS

Figure 1:
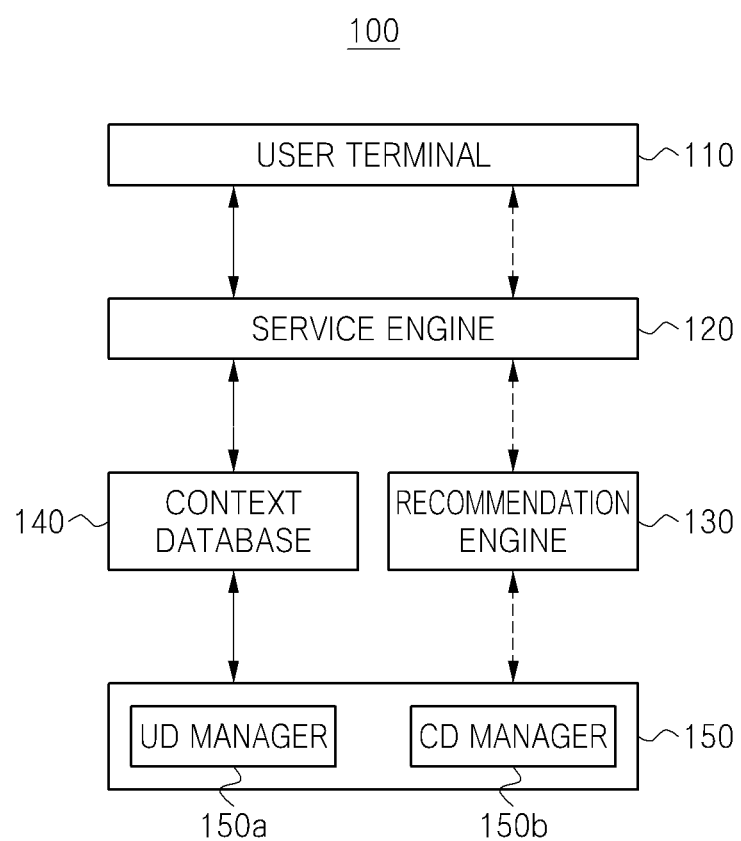
FIG. 1 is a diagram illustrating a context based service system according to an exemplary embodiment.

The inventive concept is explained through various exemplary embodiments. However, the scope of the inventive concept should not be construed to be limited to the embodiments explained herein. That is, since the embodiments may be implemented in several forms without departing from the characteristics of the inventive concept, it should also be understood that the inventive concept is not limited by any of the details of the following descriptions, unless otherwise specified, but rather should be construed broadly within its scope as defined in the appended claims. Therefore, various changes and modifications that fall within the scope of the inventive concept, or equivalents to such scope are therefore intended to be embraced by the appended claims.

Terms described in the present disclosure may be understood as follows.

While terms such as "first" and "second," etc., may be used to describe various components, such components must not be understood as being limited to the above terms. The above terms are used to distinguish one component from another. For example, a first component may be referred to as a second component without departing from the scope of rights of the inventive concept, and likewise a second component may be referred to as a first component.

The term "and/or" should be understood as including all of combination that can be made from one or more relevant items. For example, the term "the first item, the second item, and/or the third item" means not only the first, the second, or the third item, but the combination of all of items that can be made from two or more of the first, second, or third items.

It will be understood that when an element is referred to as being "connected to" another element, it can be directly connected to the other element or intervening elements may also be present. In contrast, when an element is referred to as being "directly connected to" another element, no intervening elements are present. In addition, unless explicitly described to the contrary, the word "comprise" and variations such as "comprises" or "comprising," will be understood to imply the inclusion of stated elements but not the exclusion of any other elements. Meanwhile, other expressions describing relationships between components such as "between", "immediately between" or "adjacent to" and "directly adjacent to" may be construed similarly.

Singular forms "a", "an" and "the" in the present disclosure are intended to include the plural forms as well, unless the context clearly indicates otherwise. It will be further understood that terms such as "including" or "having," etc., are intended to indicate the existence of the features, numbers, operations, actions, components, parts, or combinations thereof disclosed in the specification, and are not intended to preclude the possibility that one or more other features, numbers, operations, actions, components, parts, or combinations thereof may exist or may be added.

Identification letters (e.g., a, b, c, etc.) in respective steps are used for the sake of explanation and do not describe an order of respective steps. The respective steps may be changed from a mentioned order unless specifically mentioned in context. Namely, respective steps may be performed in the same order as described, may be substantially simultaneously performed, or may be performed in reverse order.

The inventive concept may be implemented as machine-readable codes on a machine-readable medium. The machine-readable medium includes any type of recording device for storing machine-readable data. Examples of the machine-readable recording medium include a read-only memory (ROM), a random access memory (RAM), a compact disk-read only memory (CD-ROM), a magnetic tape, a floppy disk, and optical data storage. The medium may also be carrier waves (e.g., Internet transmission). The computer-readable recording medium may be distributed among networked machine systems which store and execute machine-readable codes in a de-centralized manner.

The terms used in the embodiments described herebelow are merely used to describe particular embodiments, and are not intended to limit the inventive concept. Unless otherwise defined, all terms used herein, including technical or scientific terms, have the same meanings as those generally understood by those with ordinary knowledge in the field of art to which the embodiments belong. Such terms as those defined in a generally used dictionary are to be interpreted to have the meanings equal to the contextual meanings in the relevant field of art, and are not to be interpreted to have ideal or excessively formal meanings unless clearly defined in the embodiments.

FIG. 1 is a diagram illustrating a context based service system according to an exemplary embodiment.

Referring to FIG. 1, the context based service system 100 includes a user terminal 110, a service engine 120, a recommendation engine 130, a context database 140 and a manager 150.

The user terminal 110 (i.e., a service client) corresponds to a computing device where the computing device requests a recommended service to the service engine 120 or receives the recommended service for a service from the service engine 120. The service may include any independent value-added operation, which brings values to a user and an application providing benefits responding to a user's request. Herein, the application may include an entity in charge of responding to the user's request. For example, the user terminal 110 may correspond to a mobile terminal such as a smartphone, a tablet computer, a notebook computer or a desktop computer. According to an exemplary embodiment, the user terminal 110 may operate a user agent as a process for a service recommendation and may perform a communication with the service engine 120 through the user agent.

The service engine 120 (i.e., a service provider) corresponds to a computing device providing a service to the user terminal 110. According to an exemplary embodiment, the service engine 120 may inform information about a providable service to the recommendation engine 130 or the context database 140 and may provide a recommended service determined by the recommendation engine 130 or the context database 140 at a request of the user terminal 110 to the user terminal 110. For example, the service engine 120 may be implemented as a server interlinking with the user terminal 110, the recommendation engine 130 or the context database 140.

The recommendation engine 130 (i.e., a service recommender) corresponds to a computing device recommending the recommended service suitable for the user among the services which are providable from the service engine 120. According to an exemplary embodiment, if a request of the user terminal 110 is received from the service engine 120, the recommendation engine 130 may determine a context based service as a recommendation service or may determine a context inferred service as a recommended service. For example, the recommendation engine 130 may be implemented as a server interlinking with the service engine 120 and the manager 150.

The context database 140 corresponds to a computing device building a database for a recommended service suitable for the user among the services which are providable from the service engine 120. That is, the context database 140 may indicate a database associating the recommended service with at least one of user information (e.g., a user name and contact) and situation information (e.g., a position of the user terminal 110), hereinafter referred to as user situation information, for recommending the context based service as the recommended service. According to an exemplary embodiment, if the request of the user terminal 110 is received from the service engine 120, the context database 140 may provide the recommended service through the user situation information associated with the user terminal 110. For example, the context database 140 may interlink the service engine 120 and the manager 150.

The manager 150 (i.e., a description provider) includes a user description (UD) manager 150a and a context description (CD) manager 150b, and corresponds to a computing device assisting to determine or infer a context by the recommendation engine 130 or the context database 140. According to an exemplary embodiment, the manager 150 may correspond to the user terminal 110. The UD manager 150a may provide the user information (e.g., the user name and contact) to the recommendation engine 130 or the context database 140 and the CD manager 150b may provide situation information (e.g., the position of the user terminal 110) to the recommendation engine 130 or the context database 140. Herein, the UD manager 150a and the CD manager 150b may be classified through a logical concept not a physical concept. Therefore, the UD manager 150a and the CD manager 150b may be implemented in a same or different computing devices.

Herebelow, interface regulations being used among the user terminal 110, the service engine 120, the recommendation engine 130 and the manager 150 in the context based service system 100 will be described. The interface regulations may be defined through a UD, CD, service description (SD) and recommendation description (RD).

The UD may correspond to a set of descriptions or a set of data including user information such as an identity, an interaction, a preference and a security setting. Herein, the user information may include at least one of dynamical information and static information. According to an exemplary embodiment, the UD may be defined by the UD manager 150a, and may correspond to an interface being used when the UD manager 150a provides the user information to the recommendation engine 130. More detailed explanations associated with the UD will be described in <Appendix>.

The CD may correspond to a set of descriptions or a set of data including an environmental situation where the user device is in use or operated or the user is located. The CD may include a physical position and an environmental variable (e.g., a temperature, a humidity and a sound level). According to an exemplary embodiment, the CD may be defined by the CD manager 150b and may correspond to an interface being used when the CD manager 150b provides the environmental situation to the recommendation engine 130.

The SD may correspond to a set of descriptions or a set of data including information (e.g., a security setting) suitable for a service (or a set of sub services) provided to a final user application. According to an exemplary embodiment, the SD may be defined in the service engine 120, and may correspond to an interface being used when the service engine 120 determines the recommended service by the recommendation engine 130.

The RD may correspond to a set of recommended Information elements provided to the user terminal 110 or a set of recommendation data. This set may include a sub-set being extracted from at least one of the UD, CD and SD. According to an exemplary embodiment, the user terminal 110 or the service engine 120 may process the RD to provide a final recommended service to the user.

Figure 4:
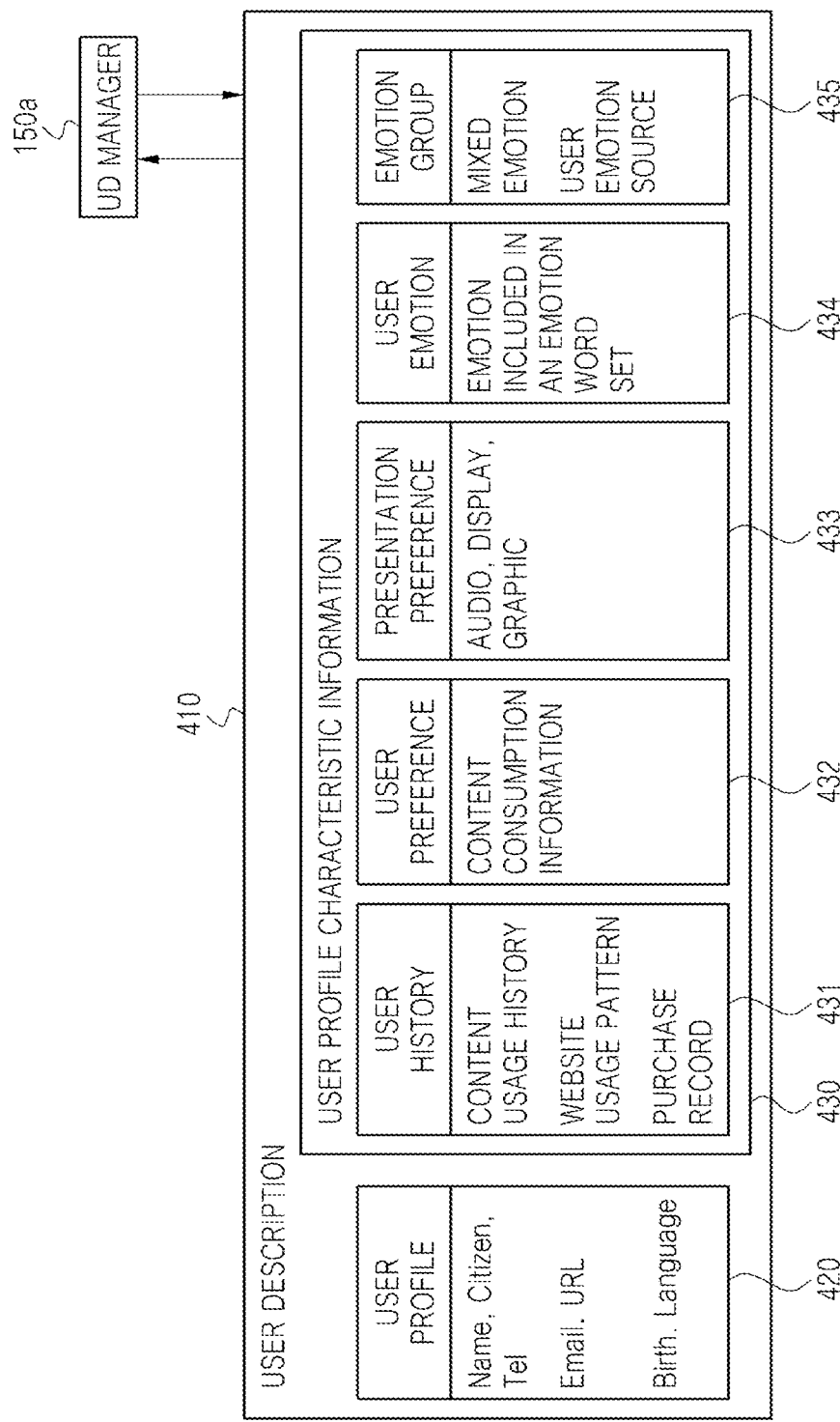
FIG. 4 is illustrates a user description (UD) being managed by a UD manager, according to an exemplary embodiment.

For example, the UD described above are illustrated in FIG. 4. FIG. 4 is a diagram illustrating a UD being managed by a UD manager. Hereinafter, FIG. 4 will be described for convenience's sake.

In FIG. 4, the UD 410 is generated in the UD manager 150a based on a user profile 420 and user profile characteristic information 430. Also, the user profile 420 and user profile characteristic information 430 are generated in the UD manager 150a through assistance of the user terminal 110.

The user profile 420 includes a profile for at least one entity and is generated through assistance of the user terminal 110 associated with the at least one entity. For example, the user profile 420 may include a name, phone number, email address, birth date and used language.

According to an exemplary embodiment, the user profile 420 may include a plurality of heterogeneous entities. For example, the plurality of the heterogeneous entities may include an animal or object as well as a person (e.g., a virtual object). When the at least one entity includes the plurality of the heterogeneous entities, a profile for a part of the plurality of the heterogeneous entities may be generated by another entity or an external entity. That is, the user profile 420 for the plurality of the heterogeneous entities may be generated through the user terminal 110 associated with the other entity in the plurality of the heterogeneous entities or the external entity for the plurality of the heterogeneous entities. For example, if the at least one entity includes a person 1, person 2, person 3, dog, cat and car corresponding to the plurality of the heterogeneous entities, the user profile 420 for each of the person 1, person 2 and person 3 may be generated though a corresponding user terminal. A user profile for the dog and the cat may be generated through the user terminal 110 associated with an owner of the dog and an owner of the cat, respectively, or an entity being closest to the dog and the cat, and a user profile for the car may be generated through the user terminal 110 associated with a person boarding the car or an entity being closet to the car.

According to an exemplary embodiment, when the user profile 420 includes a plurality of entities, a group profile may be generated as the user profile 420, and the group profile may include a user reference. Herein, the user reference may be defined through users respectively defining the plurality of the entities and a Uniform Resource Identifier (URI), and the user reference may represent a characteristic being common to the plurality of the entities included in a specific group profile. For example, if a group profile for a user a and user b boarding a common bus is generated, the group profile for the user a and user b may be generated as http://site/ab.bus.group1. That is, http://site/ab.bus.group1 corresponding to the group profile may indicate a common characteristic where the plurality of the entities are included in the group file, and the plurality of the entities are boarded at a same bus, and a link of a corresponding group file may include information of the user profile 420 for the user a and user b or distinguishable information for representing the user a and user b.

The user profile characteristic information 430 is generated in the UD manager 150a through assistance of the user terminal 110, and corresponds to information being obtained or inferred from the user terminal 110 associated with the at least one entity in the user profile 420. The user profile characteristic information 430 may include a usage history 431, user preference 432, presentation preference 433, user emotion 434 and emotion group 435.

The usage history 431 includes an action history on a specific domain for a user. That is, the usage history 431 includes information for selecting any operation when the user is on a specific domain. According to an exemplary embodiment, the usage history 431 may include at least one of a content usage history, website usage pattern and purchase record. The content usage history corresponds to information where the user uses any media content. For example, when the content usage history is represented as [a content classification, a usage number], the content usage history may be [a sports news, 290th], [a health, 500th] and [a music, 79th]. The website usage pattern corresponds to information about a website where the user visits. For example, when the website usage pattern is represented as [a website classification, a usage number], the website usage pattern may be [a search portal site, 790th], [a bank site, 36th] and [a shopping mall, 430th]. The purchase record corresponds to information about at which website what the user purchases goods or services. For example, when the purchase record is represented as [a site name, a purchase goods, a purchase number], the purchase record for a specific site A may be [A, a clothing, 79th], [A, a book, 45th] and [A, an appliance, 9th].

The user preference 432 includes content consumption information. Herein, the content consumption information may include a record of filtering, searching or reading a content. Also, the user preference 432 may include a user preference level being represented as a weight or priority for specific goods or services. For example, when the user preference is represented as [a specific service name, a preference], the user preference for services A, B and C may be represented as [a service A, second], [a service B, third] and [a service C, first].

The presentation preference 433 includes an audio presentation preference, a display presentation preference and a graphic presentation preference, and is selectively provided through a service required from the user terminal 110. The audio presentation preference is a preference related to an audio play. For example, when the user prefers a classical music, the audio presentation preference including an equalizer suitable for the classical music may be provided. The display presentation preference is a preference related to an image display. For example, when the user prefers a darkly display of an image, the display presentation preference may provide a display presentation including a lowly set brightness. The graphic presentation preference is a preference related to a graphic media expression. For example, the graphic presentation preference may include a motion for a three-dimensional (3D) image. According to an exemplary embodiment, the presentation preference 433 corresponding to at least one of the audio, display and graphic presentation may be provided according to the service required from the user terminal 110. For example, when a service for listening to a music is required from the user terminal 110, the presentation preference 433 for the audio presentation may be provided. For another example, a service for a 3D movie appreciation is required from the user terminal 110, the presentation preference 433 for the audio, display and graphic presentation preference may be provided.

The user emotion 434 corresponds to an emotion included in a predefined emotion word set, and is generated based on input data input by a user or inference data inferred through sensing by the user terminal 110. For example, when the emotion word set corresponds to {a pleasure, an excitement, a sadness, a gloom, a fatigue}, at least one emotion of the emotion word set may be selected by the user, and may be selected based on data inferred based on a temperature and a pulse obtained through a wearable device attached to the user.

The emotion group 435 includes a user emotion status generated during a specific period. Herein, the user emotion status may be defined as an emotion set representing a mixed emotion. Because the emotion group 435 includes a user emotion status generated during a specific period, the user emotion status may be changed according to changing the specific period. For example, the emotion group 435 may include a user emotion status such as [I am happy but sad a little] which is not represented by the emotion included in the emotion word set. For another example, the user emotion status is [I am happy but sad a little] during a time of 7:00 to 14:00 but the user emotion status may be changed to [I am tired but proud] during a time of 15:00 to 22:00 and such change of the user emotion status may be included in the emotion group 435.

The emotion group 435 includes a user emotion source including at least one of a trigger source and an emotion detection source. Herein, the trigger source describes a cause inducing the user emotion status, and the emotion detection source describes a modality generating the user emotion status. For example, when the user becomes sad by listening to the music, the user emotion status is [sad] and the trigger source is [listening to a music].

The UD 410 is generated based on the user profile 420 and the user profile characteristic information 430 when a recommendation of the context based service is requested from the user terminal 110. More detailed explanations associated with an expression of the UD 410 will be described in <Appendix>. According to an exemplary embodiment, dynamic information for the UD 410 may be automatically updated. Information in the UD 410 may be classified as dynamic information and static information. In more detail, the dynamic information corresponds to changeable information, for example, the user emotion or emotion group may correspond to the dynamic information. The static information corresponds to unchangeable information, for example, the user profile may correspond to the static information. That is, when the dynamic information for the UD 410 is changed, the dynamic information may be automatically updated by the UD manager 150a, and the updated information may be provided to the recommendation engine 130 by the UD manager 150a.

Figure 2:
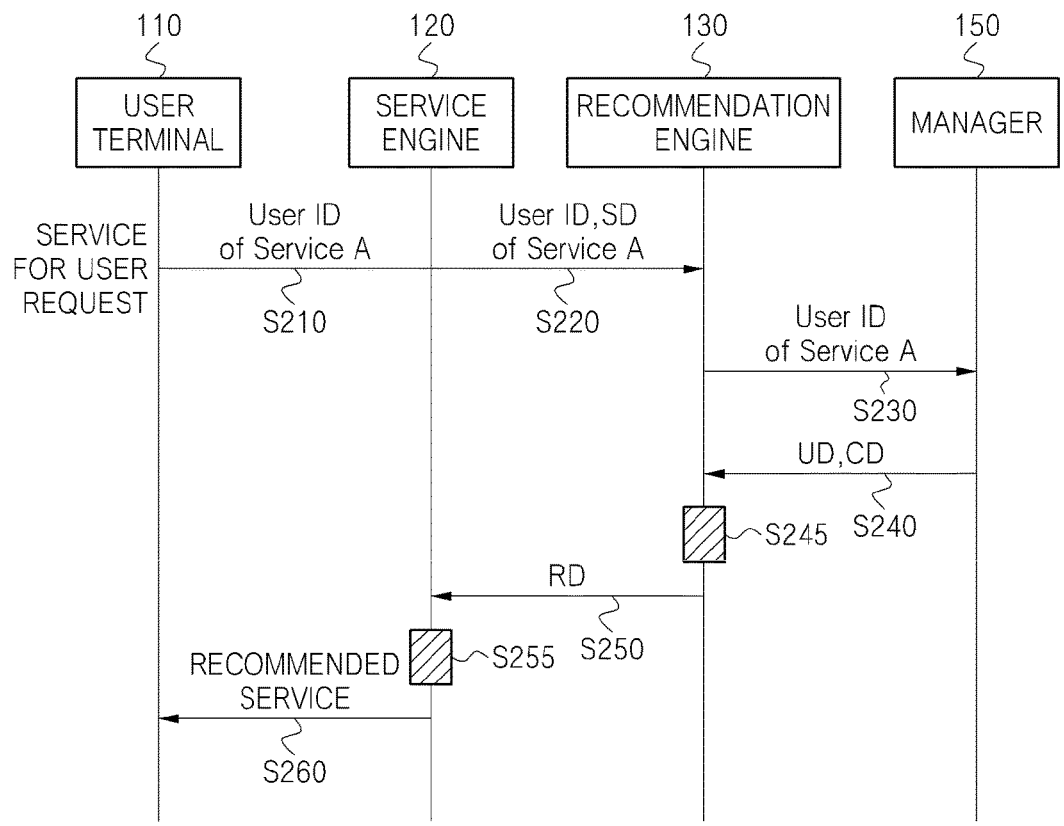
FIG. 2 is a flow chart illustrating a context based service system including a recommendation engine in FIG. 1, according to an exemplary embodiment.

FIG. 2 is a flow chart illustrating a context based service system including a recommendation engine in FIG. 1, according to an exemplary embodiment.

In FIG. 2, it is assumed that each of the user terminal 110, service engine 120, recommendation engine 130 and manager 150 is implemented as a separate computing device, and the UD manager 150a and the CD manager 150b are implemented as a same computing device. Also, it is assumed that the service engine 120 provides a service A (or a service) corresponding to an adaptive user interface service. The foregoing assumptions are provided merely according to an exemplary embodiment, and thus, the scope of the inventive concept should not be construed to be limited to the embodiment. Thus, according to another exemplary embodiment, the service engine 120 and the recommendation engine 130 may be implemented in a single computing device.

The user terminal 110 provides a user identifier (ID) for a service providing an adaptive user interface to the service engine 120 (S210). The user ID may be used for a recommendation by the recommendation engine 130, and may be implemented as a universal ID (e.g., a phone number) or an ID independently defined by the service engine 120 (e.g., a login ID being used by the service engine 120). In FIG. 2, when the adaptive user interface is recommended from the user, the user terminal 110 may request the service to the service engine 120 through the user ID.

The service engine 120 may provide the service providing the adaptive user interface. Such service may correspond to one of any independent, value-added operations or applications or may be generated through a dynamic combination of a plurality of sub-services defined by the service engine 120. Also, such service may correspond to one of value-added operations and applications being brought from another external service provider.

The service engine 120 provides the user ID and the SD provided from the user terminal 110 to the recommendation engine 130 (S220). The SD includes a decision model associated with the service provided from the service engine, and the decision model includes a decision tree and a plurality of user sets. Herein, the decision tree is used by the recommendation engine 130 and represents a user type, and the plurality of the user sets is classified through a specific criterion.

The recommendation engine 130 receives a description from the manager 150 through the user ID provided from the service engine 120 (S230 and S240). In more detail, the recommendation engine 130 transmits the user ID to the manager 150 (S230) and the manager 150 searches for a database based on the user ID to provide the description to the recommendation engine 130. According to an exemplary embodiment, the database may include a UD database and a CD database in a viewpoint of a physical implementation. According to an exemplary embodiment, when the user ID is independently defined by the service engine 120, the manager 150 may determine the description by using a service engine ID and the user ID together.

The recommendation engine 130 generates an RD based on the description provided from the manager 150 (S245). The RD may include a user type in the SD, and may be used for the service engine 120 to determine a recommended service.

The recommendation engine 130 provides the RD including the user type to the service engine 120 when the user type is determined (S250). The RD may include the user type and when the user is included in the plurality of the user type sets, the RD may include a plurality of corresponding user types.

The service engine 120 determines a recommended service being recommended through the RD provided from the recommendation engine 130 (S255). For example, when a user type in the RD is determined the [consumption progressive user type] and [the twenties female type], the service engine 120 may recommend a TV program of a genre favored by females in twenties among recent TV programs as the recommended service for a user request of a TV program.

The service engine 120 may provide the recommended service to the user terminal 110 to assist to determine whether the user terminal 110 uses the recommended service (S260).

Figure 3:
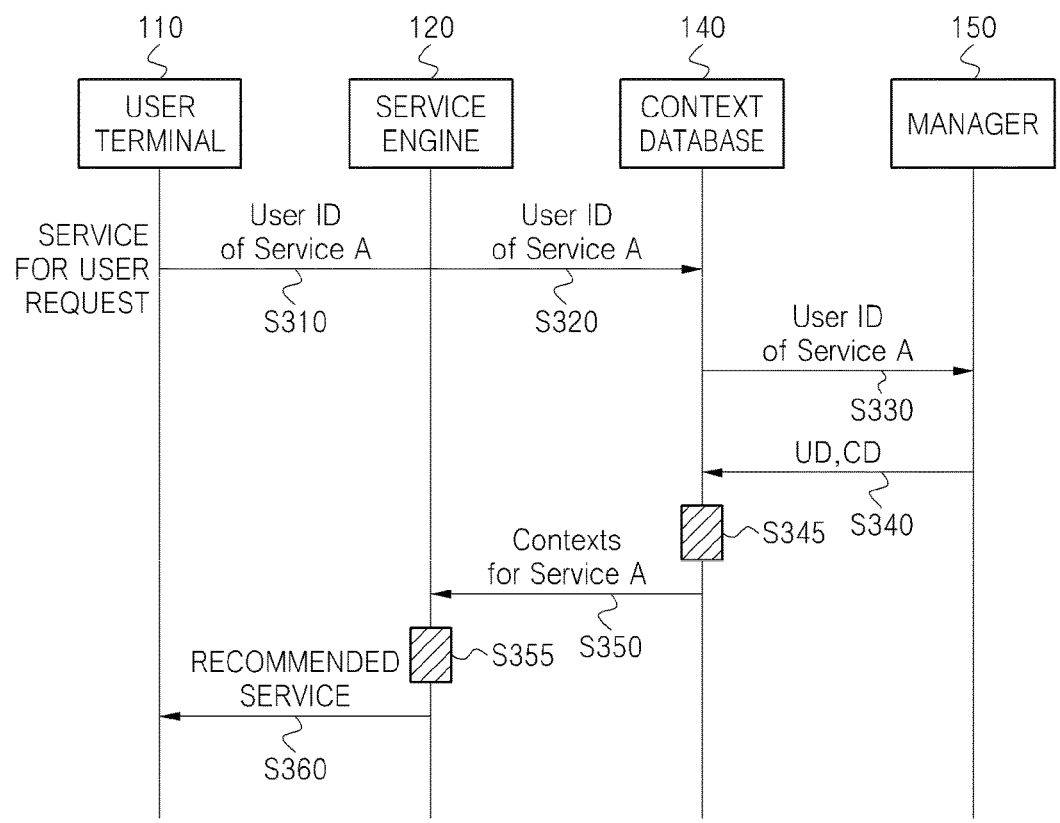
FIG. 3 is a flow chart illustrating a context based service system including a context database in FIG. 1, according to an exemplary embodiment.

FIG. 3 is a flow chart illustrating a context based service system including a context database in FIG. 1, according to an exemplary embodiment.

In FIG. 3, it is assumed that each of the user terminal 110, service engine 120, context database 140 and manager 150 is implemented as a separate computing device, and the UD manager 150a and the CD manager 150b are implemented as a same computing device. Also, it is assumed that the service engine 120 provides a service A (or a service) corresponding to an adaptive user interface service. The foregoing assumptions are provided merely according to an exemplary embodiment, and thus, the scope of the inventive concept should not be construed to be limited to the embodiment. Thus, according to another exemplary embodiment, the service engine 120 and the recommendation engine 130 may be implemented in a single computing device. Also, FIG. 3 is substantially same with FIG. 2, therefore, a same explanation with FIG. 2 will be omitted.

The user terminal 110 provides a user ID for a service providing an adaptive user interface to the service engine 120 (S310). The service engine 120 provides the user ID provided from the user terminal 110 to the context database 140 (S320).

The context database 140 checks whether a description associated with the user ID is stored in the context database 140 through the user ID provided from the service engine 120, and if the description associated with the user ID is not stored in the context description 140, the context database 140 receives the description from the manager 150 (S330 and S340). In more detail, the context database 140 transmits the user ID to the manager 150 (S330), and the manager 150 searches for a database based on the user ID to provide the description to the context database 140 (S340). According to an exemplary embodiment, the database may include the UD database and the CD database in a viewpoint of a physical implementation. According to an exemplary embodiment, when the user ID is independently defined by the service engine 120, the manager 150 may determine the description by using a service engine ID and the user ID together.

The context database 140 selects a description required for the service A based on the description provided from the manager 150 to associate and to store information for the user ID, description and service A based on the selected description (S345).

The information for the service A associated with the user ID and selected description stored in the context database 140 may be used for the service engine 120 to determine the recommended service. For example, when a service for a movie appreciation is requested from the user terminal, a user ID is [Hong Gil-dong] and a description associated with the user ID us [the twenties, male, action], the context database 140 may store {[Hong Gil-dong], [the twenties, male, action], [action movie]} and the information of {[Hong Gil-dong], [the twenties, male, action], [action movie]} may be used for the service engine 120 to determine a recommended movie.

The context database 140 provides the information about the service A obtained through the description associated with the user ID to the service engine 120 (S350), and the service engine 120 determines a recommended service being recommended through the information for the service A associated with the description provided from the context database 140 (S355). For example, when {[Hong Gil-dong], [the twenties, male, action], [action movie]} is provided from the context database 140 for a service for the movie appreciation is requested from the user terminal 110, the service engine 120 may determine an action genre favored by males in twenties as the recommended service.

The service engine 120 may provide the recommended service to the user terminal 110 to assist to determine whether the user terminal 110 uses the recommended service (Step S360).

Although exemplary embodiments are provided above in reference to the drawings, it would be understood by those skilled in the art that the inventive concept can be modified or changed in various ways without departing from the technical principles and scope of the inventive concept defined by the appended claims.

<Appendix 1: User Description>

1. Introduction

The MPEG-UD standardizes the following four data formats: User Description (UD), Context Description (CD), and Service Description (SD), and Recommendation Description (RD). The UD is a set of descriptions which may contain static and dynamic information about a user. A device, a process, a software agent, an animal, an industrial process or an organization as well as a person can be a user. We propose a structure of the UD and its several sub-sets which are elements describing various characteristics of the user.

2. UD Tool 2.1. Root Element

The UD element serves as a root element of an MPEG-UD format. The root element shall be used as a topmost element in all messages transmitted. A root element UD provides an individual description for a user. Each individual description describes specific content using a top-level type.

2.1.1. Syntax

```
<element name="UD" type="ud:UserDescriptionType"/>
<complexType name="UserDescriptionType">
    <sequence>
        <element name="UserID" type="mpeg7:UserIdentifierType"/>
        <element name="UserProfile" type="ud:UserProfileType" minOccurs="0"/>
        <element name="UsageHistory" type="ud:UsageHistoryType" minOccurs="0"/>
        <element name="Preference" type="ud:PreferenceType" minOccurs="0"/>
        <element name="Emotion" type="ud:EmotionType" minOccurs="0"/>
        <element name="Schedule" type="ud:ScheduleType" minOccurs="0"/>
        <element name="Activity" type="ud:ActivityType" minOccurs="0"/>
        <element name="Intention" type="ud:IntentionType" minOccurs="0"/>
    </sequence>
    <attributeGroup ref="ct:commonAttributes"/>
</complexType>
<complexType name="BaseUserType" abstract="true"/>
```

2.1.2. Semantics

| Name | Definition |
|---|---|
| UD | Serves as a root element of an MPEG UD format. A UD element shall be used as a topmost element to make a UD in an instance of the MPEG-UD format. |
| UserDescriptionType | Specifies a syntax of the root element. This data type is a set of descriptions which may contain static and dynamic information about user. Within this Type, UserProfile, Preference, Emotion, Schedule or Activity element shall be instantiated. |
| UserID | Describes a unique identifier of a user. |
| UserProfile | Describes a user profile based on UserProfileType |
| UsageHistory | Describes a usage history based on UsageHistoryType. This element can represent a user's history for a given service, such as searching or movie recommendations. |
| Preference | Describes a preference based on PreferenceType. |
| Emotion | Describes emotion based on EmotionType. This type represents a user's emotion, including its changes over time. |

| Name | Definition |
|---|---|
| Schedule | Describes a schedule based on ScheduleType. |
| Activity | Describes a user activity based on ActivityType. |
| Intention | Describes an intention of a user based on IntentionType. |
| commonAttributes | Describes a group of attributes for commonAttributes. The syntax and semantics of commonAttributes are specified in CommonType (M32384). |

2.2. UserProfileType

The UserProfileType represents an abstract concept of a "user". Concretely, a user can be a person, an organization (e.g., a company), a group of persons (e.g. a musical ensemble), a device or a mixed user (e.g., a cat and a person).

2.2.1. Syntax

```
<complexType name="UserProfileType" abstract="true">
    <complexContent>
        <extension base="ud:BaseUserType">
            <sequence>
                <element name="Specialty" type="ud:SpecialtyType" minOccurs="0" maxOccurs="unbounded"/>
            </sequence>
        </extension>
    </complexContent>
</complexType>
```

2.2.2. Semantics

Semantics of the UserProfileType

| Name | Definition |
|---|---|
| UserDescriptionType | Describes a basic entity of user information (abstract). A User Profile entity shall correspond to one of a variety of a user including a person, a person group, an organization, a device, a mixed user and so forth. |
| Specialty | Describes a specialty that this group has in various fields. |

2.3. PersonProfileType

The PersonProfileType describes a person entity. The PersonProfileType can be used to describe individual basic properties of persons.

2.3.1. Syntax

```
<complexType name="PersonProfileType">
    <complexContent>
        <extension base="ud:UserProfileType">
            <sequence>
                <element name="PersonInformation" type="mpeg7:PersonType" minOccurs="0"/>
                <element name="Birthtime" type="dateTime"/>
                <element name="Language" type="ud:LanguageType" minOccurs="0" maxOccurs="unbounded"/>
                <element name="Accessibility" type="ud:AccessibilityType" minOccurs="0"/>
                <element name="SocialInformation" type="ud:SocialType" minOccurs="0" maxOccurs="unbounded"/>
            </sequence>
        </extension>
```
```
    </complexContent>
</complexType>
```

2.3.2. Semantics

Semantics of the Person ProfileType

| Name | Definition |
|---|---|
| Language | User language |
| Accessibility | User accessibility |
| SocialInformation | User Social Information |

2.4. GroupedProfileType

The GroupedProfileType can be used to describe basic attributes of a group which is a set of users.

2.4.1. Syntax

```
<complexType name="GroupedProfileType">
    <complexContent>
        <extension base="ud:UserProfileType">
            <choice minOccurs="2" maxOccurs="unbounded">
                <element name="User" type="ud:UserProfileType"/>
                <element name="UserRef" type="anyURI"/>
            </choice>
        </extension>
    </complexContent>
</complexType>
```

2.4.2. Semantics

Semantics of the GroupedProfileType

| Name | Definition |
|---|---|
| GroupedProfileType | Describes an individual group's basic profile. |
| User | Describes information of a group's member. (i.e. User Profile, Device Profile, Organization Profile) |
| UserRef | Describes the reference of a group's member as anyURI. |

2.4.3. Example

```
<ud:UserProfile xsi:type="ud:PersonGroupProfileType">
    <ud:BasicInformation>
        <mpeg7:Name>GroupOrchestraABC</mpeg7:Name>
    </ud:BasicInformation>
    <ud:Specialty domain="Playing">
        <ud:Name>Piano Trio</ud:Name>
    </ud:Specialty>
</ud:UserProfile>
```

2.5. LanguageType

The LanguageType can be used to describe properties of a specific language that a user can use.

2.5.1. Syntax

Semantics of the LanguageType:

```xml
<complexType name="LanguageType">
    <sequence>
        <element name="Name" type="language"/>
        <element name="CompetenceReference" type="ud:LanguageCompetenceReferenceType" minOccurs="0"/>
    </sequence>
    <attribute name="type">
        <simpleType>
            <restriction base="string">
                <enumeration value="native"/>
                <enumeration value="foreign"/>
            </restriction>
        </simpleType>
    </attribute>
    <attribute name="LanguageRegion" type="string" use="optional"/>
    <attribute name="LanguageAccent" type="string" use="optional"/>
    <attribute name="ReadingLevel" use="optional">
        <simpleType>
            <restriction base="NMTOKEN">
                <enumeration value="low"/>
                <enumeration value="mid"/>
                <enumeration value="high"/>
            </restriction>
        </simpleType>
    </attribute>
    <attribute name="WritingLevel" use="optional">
        <simpleType>
            <restriction base="NMTOKEN">
                <enumeration value="low"/>
                <enumeration value="mid"/>
                <enumeration value="high"/>
            </restriction>
        </simpleType>
    </attribute>
    <attribute name="SpeakingLevel" use="optional">
        <simpleType>
            <restriction base="NMTOKEN">
                <enumeration value="low"/>
                <enumeration value="mid"/>
                <enumeration value="high"/>
            </restriction>
        </simpleType>
    </attribute>
    <attribute name="ListeningLevel" use="optional">
        <simpleType>
            <restriction base="NMTOKEN">
                <enumeration value="low"/>
                <enumeration value="mid"/>
                <enumeration value="high"/>
            </restriction>
        </simpleType>
    </attribute>
</complexType>
```

2.5.2. Semantics

| Name | Definition |
| --- | --- |
| LanguageType | Describes one or more languages that a user can use. Multiple languages are allowed. |
| Name | Indicates a name of a language which this user can use. |
| LanguageRegion | Describes a language based on a region where the language is used. E.g., British English, South Korean |
| Type | Indicates types of language. The types of language are defined as follows: Native - This is the language that a person has spoken from earliest childhood. Foreign - This is any other languages except for the native language. |
| LanguageAccent | Describes an accent of a language. E.g., Italian Accent, Jeju Accent. |
| ReadingLevel | Describes a reading level of a user for a specific language |
| WritingLevel | Describes a writing level of a user for a specific language |
| SpeakingLevel | Describes a speaking level of a user for a specific language |

-continued

| Name | Definition |
|---|---|
| ListeningLevel | Describes a listening level of a user for a specific language |

2.6. LanguageCompetenceReferenceType

2.6.1. Syntax

```
<complexType name="LanguageCompetenceReferenceType">
    <sequence>
        <element name="CompetenceTestName"
            type="string"/>
        <element name="CompetenceLevel"
type="CompetenceLevelType" maxOccurs="unbounded"/>
    </sequence>
    <attribute name="CompetenceTestURI" type="anyURI"
use="optional"/>
    <attribute name="CompetenceTestDate" type="date"
use="optional"/>
</complexType>
<complexType name="CompetenceLevelType">
    <sequence>
        <choice>
            <element name="FieldScore">
                <complexType>
                    <simpleContent>
                        <extension base="integer">
                            <attribute name="maxScore"
type="integer" use="optional"/>
                        </extension>
                    </simpleContent>
                </complexType>
            </element>
            <element name="FieldLevel" type="string"/>
        </choice>
    </sequence>
    <attribute name="competenceField" type="string"
        use="optional"/>
</complexType>
```

2.6.2. Semantics

| Name | Definition |
|---|---|
| LanguageCompetenceReferenceType | Describes a user's competence for a specific language in a common test |
| CompetenceTest Name | Provides a competence test name. E.g., TOEFL, IELTS |
| CompetenceLevel | Provides a score or level of a competence test. |
| CompetenceTestURI | Provides a URI of a competence test. E.g., http://www.ets.org/toefl |
| CompetenceTestDate | Provides a date of a competence test taken by a user. |

2.7. AccessibilityType

The AccessibilityType can be used to describe characteristics of a user's deficiency. The description can be used by an adaptation specific engine to optimize an experience of contents and a user interface for the user, and to recommend a best way to achieve special goals for the user having problems with specific physical difficulties.

2.7.1. Syntax

```
<complexType name="AccessibilityType">
    <sequence>
        <element name="AuditoryImpairment"
type="mpeg21:AuditoryImpairmentType" minOccurs="0"/>
        <element name="VisualImpairment"
type="mpeg21:VisualImpairmentType" minOccurs="0"/>
        <element name="BodyImpairment"
            type="ud:BodyImpairmentType"
minOccurs="0"/>
    </sequence>
</complexType>
<complexType name="BodyImpairmentType">
    <attribute name="availableFinger" type="integer"/>
    <attribute name="arm" type="ud:side"/>
    <attribute name="leg" type="ud:side"/>
</complexType>
<simpleType name="side">
    <restriction base="NMTOKEN">
        <enumeration value="both"/>
        <enumeration value="left"/>
        <enumeration value="right"/>
    </restriction>
</simpleType>
```

2.7.2. Semantics

Semantics of the AccessibilityType:

| Name | Definition |
|---|---|
| AccessibilityType | Describes user's differences in his/her abilities in detail in terms of accessibility needs. The Accessibility element describes in a systematic way so that it covers well possible weakness to access a service in any area. |
| AuditoryImpairment | Describes characteristics of a particular user's auditory deficiency. The description can be used by an audio resource adaptation engine to optimize an experience of audio contents for a user. It can be also used by a contents provider to support more suitable contents to consider user's impairment. |
| VisualImpairment | Visual Impairment covers a wide range of conditions. The various forms of visual impairment include a difficulty to read a fine print, low vision that cannot be corrected by standard glasses, total blindness, a color vision deficiency, i.e., the inability to recognize certain colors. The low vision conditions, due to their wide variety, are described by a user's symptoms, but the names of conditions are not described. |
| BodyImpairmentType | Describes characteristics of a user's body deficiency |
| availableFinger | Indicates the number of available fingers |
| Arm | Indicates a deficiency of arms. |
| Leg | Indicates a deficiency of legs. |
| Side | Describes specific side information |
| Both | Indicates both sides |
| Left | Indicates a left side |
| Right | Indicates a right side |

2.8. Social Type

2.8.1. Syntax

```
<xsd:complexType name="SocialType" abstract="true">
    <xsd:sequence>
        <xsd:element name="SocialCommunity" type="xsd:string"
minOccurs="0"/>
```

```
        <xsd:element name="Sharing" type="SharingType"
minOccurs="0"/>
    </xsd:sequence>
</xsd:complexType>
```

2.8.2 Semantics

Semantics of the SocialType:

| Name | Definition |
|---|---|
| SocialCommunity | Describes information on social communities provided by a given service |
| Sharing | Describes information on user's sharing objects |

2.9. UsageHistoryType

The UsageHistoryType describes a history of actions on a specific area by a user. A usage history of media contents, movement of a user, a pattern in an on-line social network and a purchase record at a specific store can be UsageHistory.

2.9.1. Syntax

```
<complexType name="UsageHistoryType">
    <complexContent>
        <extension base="ud:BaseUserType">
            <sequence>
                <element name="DetailedUserInteraction" type="ud:DetailedUserInteractionType"/>
            </sequence>
        </extension>
    </complexContent>
</complexType>
<complexType name="DetailedUserInteractionType">
    <annotation>
        <documentation>The main complex type describing detailed interaction with multimedia items</documentation>
    </annotation>
    <complexContent>
        <extension base="ud:BaseUserType">
            <sequence>
                <element name="MultimediaExperiences">
                    <complexType>
                        <sequence>
                            <element name="MultimediaExperience" type="ud:MultimediaExperienceType"/>
                        </sequence>
                    </complexType>
                </element>
            </sequence>
        </extension>
    </complexContent>
</complexType>
```

2.9.2. Semantics

Semantics of the UsageHistoryType:

| Name | Definition |
|---|---|
| UsageHistoryType | Describes a history of actions on a specific area by a user. A usage history of media contents, movement of a user, a pattern in an on-line social network and a purchase record at a specific store can be a UsageHistory. UsageHistoryType extends BaseUserType. |

| Name | Definition |
|---|---|
| MultimediaExperiences | A set of multimedia experiences of a user |
| DetailedUserInteraction | Structure containing information about multimedia experiences of a user. |

2.10. EventType

An abstract representation of a generic real event.

2.10.1. Syntax

```
<xs:complexType name="eventType" abstract="true">
    <xs:annotation>
        <xs:documentation>An abstract representation of a generic real event</xs:documentation>
    </xs:annotation>
    <xs:attribute name="startTime" type="xs:dateTime"/>
    <xs:attribute name="endTime" type="xs:dateTime"/>
    <xs:attribute name="coordinates" type="xs:anyURI"/>
</xs:complexType>
```

2.10.2. Semantics

Semantics of the EventType:

| Name | Definition |
|---|---|
| eventType | An abstract representation of a generic real event |
| startTime | The start time of the event |
| endTime | The end time of the event |
| Coordinates | The geolocalisation of the event |

2.11. interactionAtomType

An abstract representation of observables and artefacts.

2.11.1. Syntax

```
<complexType name="InteractionAtomType">
    <annotation>
        <documentation>An abstract representation of observables and artefacts</documentation>
    </annotation>
    <sequence>
        <element name="Role" type="anyURI">
            <annotation>
                <documentation>A piece of metadata that expresses the functionality of an interaction atom (e.g. an observable or an artefact) while in a specific state. For example, if the user adds a text part (artefact) with the intention of annotating an image (observable), then the role of such text will be "annotation"</documentation>
            </annotation>
        </element>
        <element name="MultimediaObject" type="didl:ItemType">
            <annotation>
                <documentation>Any type of data that can be handled by a device in order to produce multimedia contents, e.g. in video, audio, text formats. The description of a multimedia object may include its low-level characteristics (e.g. the "colour histogram" of a video). A multimedia object can play a role as an observable or as an artefact during a state of a multimedia experience. Multimedia objects comprise the following types of objects:
```

```
        Text, Image, Video, AudioVisual, Audio, Application
    </documentation>
                </annotation>
            </element>
            <sequence minOccurs="0">
                <element name="Composition">
                    <complexType>
                        <sequence maxOccurs="unbounded">
                            <element name="Artefact" type="ud:ArtefactType"/>
                            <element name="Observable" type="ud:ObservableType"/>
                        </sequence>
                    </complexType>
                </element>
            </sequence>
        </sequence>
    </complexType>
```

2.11.2. Semantics

Semantics of the interactionAtomType:

| Name | Definition |
| --- | --- |
| InteractionAtomType | An abstract representation of observables and artefacts |
| Role | A piece of metadata that expresses a functionality of an interaction atom (e.g. an observable or an artefact) while in a specific state. For example, if a user adds a text part (artefact) with an intention of annotating an image (observable), then a role of such text will be "annotation" |
| MultimediaObject | Any type of data that can be handled by a device in order to produce multimedia contents, e.g. in video, audio, text formats. A description of a multimedia object may include its low-level characteristics (e.g. the "colour histogram" of a video). A multimedia object can play a role as an observable or as an artefact during a state of a multimedia experience. Multimedia objects comprise following types of object: Text, Image, Video, AudioVisual, Audio, Application |
| Composition | Any composition of Artefacts or Observables |

2.12. ArtefactType

A specific multimedia object added to an observable by a user while in a specific state. An artefact is any multimedia object actively generated by a user (e.g. tags, annotations, voice) or selected by the user during a specific state of his/her multimedia experience.

2.12.1. Syntax

```
    <complexType name="ArtefactType">
        <annotation>
            <documentation>A specific multimedia object added to an observable by a user while in a specific state. An artefact is any multimedia object actively generated by the user (e.g. tags, annotations, voice) or selected by the user during a specific state of his/her multimedia experience</documentation>
        </annotation>
        <complexContent>
            <extension base="ud:InteractionAtomType"/>
        </complexContent>
    </complexType>
```

2.13. ObservableType

A specific multimedia object that a user may decide to use, while in a specific state, during his/her multimedia experience. An observable is any multimedia object visible to the user in a specific state (e.g. an image in the graphic interface).

2.13.1. Syntax

```
    <complexType name="ObservableType">
        <annotation>
            <documentation>A specific multimedia object that a user may decide to use, while in a specific state, during his/her multimedia experience. An observable is any multimedia object visible to the user in a specific state (e.g. an image in the graphic interface)</documentation>
        </annotation>
        <complexContent>
            <extension base="ud:InteractionAtomType">
                <sequence>
                    <element name="UsageEvent" type="ud:EventType">
                        <annotation>
                            <documentation>A specific event which occurs every time the user decides to actually use an observable (e.g. when the user is reading a text, watching a video, ...)</documentation>
                        </annotation>
                    </element>
                </sequence>
            </extension>
        </complexContent>
    </complexType>
```

2.13.2. Semantics

| Name | Definition |
| --- | --- |
| UsageEvent | Structure containing information about when an observable has been actually used by a user. A specific event which occurs every time the user decides to actually use an observable (e.g. when the user is reading a text, watching a video, . . .) |

2.14. MultimediaExperienceType

A complex set of events (states and usage events) representing fruition by a user, within a given time interval, of a certain number of multimedia contents.

2.14.1. Syntax

```
    <complexType name="MultimediaExperienceType">
        <annotation>
            <documentation>The complex set of events (states and usage events) representing fruition by a user, within a given time interval, of a certain number of multimedia contents</documentation>
        </annotation>
        <sequence>
            <element name="States">
                <complexType>
                    <sequence>
                        <element name="State" type="ud:StateType" maxOccurs="unbounded"/>
                    </sequence>
                </complexType>
            </element>
        </sequence>
    </complexType>
```

2.14.2. Semantics

| Name | Definition |
|---|---|
| States | States that compose a multimedia experience |
| Semantically-RelatedStates | Structure pointing to semantically related states to a current state. Specific semantics of this relation is demanded to a controlled vocabulary. |

2.15. stateType

A specific event, identified by a set of "variables" or "coordinates" univocally identifying a set of interaction atoms and their respective roles in a given state of a multimedia experience.

2.15.1. Syntax

```
<complexType name="StateType">
    <annotation>
        <documentation>A specific event, identified by a set of "variables" or "coordinates" univocally identifying a set of interaction atoms and their respective roles in a given state of a multimedia experience</documentation>
    </annotation>
    <complexContent>
        <extension base="ud:EventType">
            <sequence>
                <element name="Artefacts">
                    <complexType>
                        <sequence>
                            <element name="Artefact" type="ud:ArtefactType" maxOccurs="unbounded"/>
                        </sequence>
                    </complexType>
                </element>
                <element name="Observables">
                    <complexType>
                        <sequence>
                            <element name="Observable" type="ud:ObservableType" maxOccurs="unbounded"/>
                        </sequence>
                    </complexType>
                </element>
                <element name="SemanticallyRelatedStates">
                    <complexType>
                        <sequence>
                            <element name="StatesRef">
                                <simpleType>
                                    <list itemType="anyURI"/>
                                </simpleType>
                            </element>
                        </sequence>
                    </complexType>
                </element>
            </sequence>
            <attribute name="order" type="nonNegativeInteger"/>
            <attribute name="id" type="anyURI"/>
        </extension>
    </complexContent>
</complexType>
```

2.15.2. Semantics

| Name | Definition |
|---|---|
| Artefacts | Artefacts characterizing a state |
| Observables | Observables characterizing a state |

2.16. PreferenceType

This PreferenceType describes a preference related to various services. A Preference could be conceived of as an individual's attitude towards a set of objects. Interested topics, a preference on a presentation style, a sensory effects preference, a score of satisfaction, service usage preferences, a preference on service provider, interested topics and media can be a Preference.

2.16.1. Syntax

```
<complexType name="PreferenceType">
    <complexContent>
        <extension base="ud:BaseUserType">
            <sequence>
                <element name="UserPreferences" type="mpeg7:UserPreferencesType" minOccurs="0"/>
                <element name="AudioPresentationPreferences" type="mpeg21:AudioPresentationPreferencesType" minOccurs="0"/>
                <element name="DisplayPresentationPreferences" type="mpeg21:DisplayPresentationPreferencesType" minOccurs="0"/>
                <element name="GraphicsPresentationPreferences" type="mpeg21:GraphicsPresentationPreferencesType" minOccurs="0"/>
                <element name="ServicePreference" type="ud:ServicePreferencesType" minOccurs="0" maxOccurs="unbounded"/>
                <element name="TranslationPreference" type="ud:TranslationPreferenceType" minOccurs="0"/>
                <element name="PreferenceDescription" type="ud:UserDescriptionType"/>
            </sequence>
        </extension>
    </complexContent>
</complexType>
```

2.16.2. Semantics

Semantics of the PreferenceType:

| Name | Definition |
|---|---|
| PreferenceType | Describes a preference related to various services. A Preference could be conceived of as an individual's attitude towards a set of objects. Interested topics, a preference on a presentation style, a sensory effects preference, a score of satisfaction, service usage preferences, a preference on a service provider, interested topics and media can be a Preference. |
| UserPreferences | Describes user's preferences pertaining to consumption of a multimedia content, in particular, filtering, searching and browsing of the multimedia content. The mpeg7: UserPreferencesType contains FilteringAndSearchPreferences, BrowsingPreferences and RecordingPreferences, and contains an attribute indicating whether user's preferences may be updated automatically. |
| AudioPresentationPreferences | Describes preferences of a user regarding presentation or rendering or audio resources. The mpeg7 mpeg21: AudioPresentationPreferencesType contains VolumeControl, AudibleFrequencyRange, AudioOutputDevice, BalancePreference, Soundfield and SoniferousSpeed element. |

-continued

| Name | Definition |
|---|---|
| DisplayPresentationPreferences | Describes preferences of a user regarding presentation or rendering of images and videos. This mpeg21: DisplayPresentationPreferencesType includes descriptors of preferences related to a color and a conversion of stereoscopic video. The ColorTemperaturePreference, the BrightnessPreference, the SaturationPreference and the ContrastPreference describe preferences of a user regarding a color of displayed visual contents in terms of a color temperature, brightness, saturation and contrast, each of which is a usual color attribute of images. StereoscopicVideoConversion describes preferences of a user related to conversion of a 2D video to a 3D stereoscopic video and also conversion of a 3D stereoscopic video to a 2D video. |
| GraphicsPresentationPreferences | Describes presentation preferences related to graphics media. This mpeg21: GraphicsPresentationPreferencesType contains GeometryEmphasis, TextureEmphasis and AnimationEmphasis element. |
| UserSensoryPreference | Describes sensor preferences. |
| ServicePreference | Describes a level of preferences for specific services. |
| UserInputModalityPreference | |
| ObjectTypePreference | |
| TranslationPreference | Describes a list of user's preferences for language translation |
| PreferenceDescription | |

2.17. ServicePreferencesType

ServicePreferencesType describes a level of preferences for specific services. Every user can have his personal preferences of the various services, respectively. A UD document can contain preferences about specific services and providers of services recommendation.

2.17.1. Syntax

```
<complexType name="ServicePreferencesType">
    <sequence>
        <element name="Service" type="anyURI"
            minOccurs="0"/>
        <element name="ServicePriority"
type="ct:ZeroToTenOrdinalType" minOccurs="0"/>
    </sequence>
    <attribute name="preferenceLevel"
type="ct:ZeroToOnehundredOrdinalType" use="required"/>
</complexType>
```

2.17.2. Semantics

Semantics of the ServicePreferencesType:

| Name | Definition |
|---|---|
| ServicePreferencesType | Describes a level of preferences for specific services. Every user can have his/her personal preference of the various services, respectively. A UD document can contain preferences about specific services and providers of services recommendation |
| ServicePriority preferenceLevel | Indicate a priority or weight assigned to a particular user preference, relative to other components. A range of preference values is from 0 to 100. |

2.17.3. Examples

```
<ud:Preference>
    <ud:ServicePreference preferenceLevel="95">
        <ud:Name>ABC Service</ud:Name>
        <ud:Identifier>http://ABC.com</ud:Identifier>
        <ud:ProviderIdentifier>ABC Company</ud:ProviderIdentifier>
    </ud:ServicePreference>
</ud:Preference>
```

2.18. Translation PreferencesType

This Translation PreferencesType describes the preferences for translation services.

2.18.1. Syntax

```
<complexType name="TranslationPreferenceType">
    <sequence>
        <element name="SourceLanguagePreference"
type="language" minOccurs="0"/>
        <element name="TargetLanguagePreference"
type="language" minOccurs="0"/>
        <element name="SpeechStylePreference"
type="ud:SpeechStylePreferenceType"/>
        <element name="VoiceGenderPreference"
type="ud:VoiceGenderType" default="unspecified" minOccurs="0"/>
    </sequence>
    <attribute name="VoicePitch" type="mpeg7:nonNegativeReal"
use="optional"/>
    <attribute name="VoiceSpeed" type="mpeg7:nonNegativeReal"
use="optional"/>
    <attribute name="RequestVariants" type="boolean"
use="optional" default="false"/>
</complexType>
```

2.18.2. Semantics

Semantics of the ServicePreferencesType:

| Name | Definition |
|---|---|
| SourceLanguagePreference | Describes a user's preference on a source language for translation. |
| TargetLanguagePreference | Describes a user's preference on a target language for translation. |
| SpeechStylePreference | Describes a user's preference on a style of a translated output speech. |
| VoiceGenderPreference | Describes a user's preference on a gender of a translated output speech. |
| VoicePitch | Describes a user's preference on a pitch of a translated output speech. |
| VoiceSpeed | Describes a user's preference on a speed of a translated output speech. |
| RequestVariants | |

2.19. SpeechStylePreferenceType

2.19.1. Syntax

```
<simpleType name="SpeechStylePreferenceType">
    <restriction base="NMTOKEN">
        <enumeration value="formal"/>
        <enumeration value="informal"/>
    </restriction>
</simpleType>
```

2.20. VoiceGenderType

2.20.1. Syntax

```
<simpleType name="VoiceGenderType">
    <restriction base="NMTOKEN">
        <enumeration value="female"/>
        <enumeration value="male"/>
        <enumeration value="neuter"/>
```

-continued

```
        <enumeration value="unspecified"/>
    </restriction>
</simpleType>
```

2.21. EmotionType

The EmotionType can be used to represents a user's subjective notion and feeling. It can describe user's emotion including its changes over time. The emotion can be acquired by some direct input of the user or inference results from sensor data.

2.21.1. Syntax

```
<complexType name="EmotionType">
    <complexContent>
        <extension base="ud:BaseUserType">
            <sequence>
                <choice minOccurs="0" maxOccurs="unbounded">
                    <element name="EmotionGroup" type="ud:EmotionGroupType"/>
                    <choice>
                        <element name="DynamicEmotionVocabularySet" type="ud:VocabularySetType">
                            <unique name="unique-vocabulary">
                                <selector xpath="ud:vocabulary"/>
                                <field xpath="@name"/>
                            </unique>
                        </element>
                        <element name="StaticEmotionVocabularySet" type="ct:termReferenceListType"/>
                    </choice>
                </choice>
            </sequence>
        </extension>
    </complexContent>
</complexType>
```

2.21.2. Semantics

Semantics of the EmotionType:

| Name | Definition |
|---|---|
| EmotionType | Describes a user's subjective notion and feeling. It can describe a user's emotion including its changes over time. The emotion can be acquired by some direct input of the user or inference results from sensor data. |
| EmotionGroup | Describes an emotion or some related information. The emotion is described by several EmotionDescription, each being present with different values of reliability. |
| DynamicEmotionVocabularySet | Describes a dynamic set of emotion vocabularies. Only vocabulary names defined in a declared emotion vocabulary set of a given element can be used for representations of emotions. The VocabularySetType can be used to describe fundamental emotions according to a set of definite criteria. Many different theories implicitly posit different ontologies of emotion. There has been dispute about what emotions really are, and indeed. For this reason, a complete set of vocabularies for representing emotions does not exist. The VocabularySetType can be temporarily used to define a set of emotion vocabularies to solve that problem. |
| StaticEmotionVocabularySet | Describes a static set of emotion vocabularies. Other values that are datatype-valid with respect to mpeg7: termReferenceType are reserved. |

2.21.3. Examples

```
<ud:Emotion>
    <ud:EmotionGroup
        triggeredBy="http://www.abc.com/video.mp4"
        detectedFrom="eyes" emotion-set="#big6">
        <ud:PeriodOfOccurrence>
            <ct:startTime>2001-12-17T09:30:47Z</ct:startTime>
            <ct:endTime>2001-12-17T12:30:47Z</ct:endTime>
        </ud:PeriodOfOccurrence>
        <ud:EmotionDescription reliability="0.9">
            <ud:emotionName>anger</ud:emotionName>
            <ud:value>
                <ct:ZeroToOneRatio>0.5</ct:ZeroToOneRatio>
            </ud:value>
        </ud:EmotionDescription>
    </ud:EmotionGroup>
    <ud:EmotionGroup
        triggeredBy="http://www.abc.com/happy.mp3"
        detectedFrom="ears"
        emotion-set="/EmotionVocabularySet#mpegud-emotion">
        <ud:PeriodOfOccurrence>
            <ct:startTime>2001-12-19T09:30:47Z</ct:startTime>
            <ct:endTime>2001-12-19T10:39:47Z</ct:endTime>
        </ud:PeriodOfOccurrence>
        <ud:EmotionDescription reliability="0.2">
            <ud:emotionName>emotion1</ud:emotionName>
            <ud:value>
                <ct:ZeroToOneRatio>0.5</ct:ZeroToOneRatio>
            </ud:value>
        </ud:EmotionDescription>
        <ud:EmotionDescription>
            <ud:emotionName>emotion2</ud:emotionName>
            <ud:value>
                <ct:ZeroToOneRatio>0.9</ct:ZeroToOneRatio>
            </ud:value>
```

-continued

```
        </ud:EmotionDescription>
    </ud:EmotionGroup>
    <ud:EmotionVocabularySet id="big6">
        <ud:vocabulary name="anger"/>
        <ud:vocabulary name="disgust"/>
        <ud:vocabulary name="fear"/>
        <ud:vocabulary name="happiness"/>
        <ud:vocabulary name="sadness"/>
        <ud:vocabulary name="surprise"/>
    </ud:EmotionVocabularySet>
    <ud:EmotionVocabularySet id="mpegud-emotion">
        <ud:vocabulary name="emotion1"/>
        <ud:vocabulary name="emotion2"/>
        <ud:vocabulary name="emotion3"/>
    </ud:EmotionVocabularySet>
</ud:Emotion>
<ud:Emotion>
    <ud:EmotionVocabularySet id="big6">
        <ud:vocabulary name="anger"/>
        <ud:vocabulary name="disgust"/>
        <ud:vocabulary name="fear"/>
        <ud:vocabulary name="happiness"/>
        <ud:vocabulary name="sadness"/>
        <ud:vocabulary name="surprise"/>
    </ud:EmotionVocabularySet>
    <ud:EmotionVocabularySet id="pad">
        <ud:vocabulary name="pleasure"/>
        <ud:vocabulary name="arousal"/>
        <ud:vocabulary name="dominance"/>
    </ud:EmotionVocabularySet>
    <ud:EmotionVocabularySet id="mpegud-emotion">
        <ud:vocabulary name="emotion1"/>
        <ud:vocabulary name="emotion2"/>
        <ud:vocabulary name="emotion3"/>
    </ud:EmotionVocabularySet>
</ud:Emotion>
```

2.22. VocabularySetType

The VocabularySetType can be used to describe fundamental vocabularies according to a set of definite criteria. There has been a dispute about what vocabularies really are, and indeed to describe specific information. For this reason, a complete set of vocabularies for representing a special domain does not exist. The VocabularySetType can be used to describe a temporarily used set of vocabularies.

2.22.1. Syntax

```
<complexType name="VocabularySetType">
    <sequence>
        <element name="vocabulary" maxOccurs="unbounded">
            <complexType>
                <attribute name="name" type="ct:valueByNominal" use="required"/>
            </complexType>
        </element>
    </sequence>
    <attribute name="id" type="ID" use="required"/>
</complexType>
```

2.22.2. Semantics

Semantics of the VocabularySetType:

| Name | Definition |
|---|---|
| VocabularySetType | Describe fundamental vocabularies according to a set of definite criteria. There has been a dispute about what vocabularies really are, and indeed to describe specific information. For this reason, a complete set of vocabularies for representing a special domain does not exist. The VocabularySetType can be used to describe a temporarily used set of vocabularies. |
| Vocabulary | Describes some information about each vocabulary which composes an emotionvocabularyset. |
| Name | Describes a name of vocabulary |
| Id | Describes a unique ID of a VocabularySet |

2.23. EmotionGroupType

The EmotionGroupType can be used to describe and specify detailed information about an emotion state of a user according to a specific duration. The emotion-set attribute declares a global emotion vocabulary set which is predefined by EmotionVocabularySetType Element.

2.23.1. Syntax

```
<complexType name="EmotionGroupType">
    <sequence>
        <element name="PeriodOfOccurrence" type="ct:TimeType"/>
        <element name="EmotionDescription" type="ud:EmotionDescriptionType" maxOccurs="unbounded"/>
    </sequence>
    <attributeGroup ref="ud:EmotionSource"/>
    <attribute name="emotion-set" type="anyURI" use="required"/>
</complexType>
<attributeGroup name="EmotionSource">
    <attribute name="triggeredBy" type="anyURI"/>
    <attribute name="detectedFrom" type="string"/>
</attributeGroup>
<complexType name="EmotionDescriptionType">
    <sequence>
        <element name="emotionName" type="token"/>
        <element name="value" type="ct:normalizedRatioValueType"/>
    </sequence>
    <attribute name="reliability" type="ct:ZeroToOneRatioType"/>
</complexType>
```

2.23.2. Semantics

Semantics of the EmotionGroupType:

| Name | Definition |
|---|---|
| EmotionGroupType | Describes an emotion or some related information. The emotion is described by several EmotionDescriptions, each being present with different values of reliability. |
| PeriodOfOccurrence | Describes starting and ending absolute times. This ct: TimeType denotes an absolute time at which an emotion or related some information happened. |

| Name | Definition |
|---|---|
| EmotionDescription | Describes a specific emotional state. |
| emotionName | Denotes a name of emotion as a result of measuring a user's emotional state. A value of "name" must be one of predefined vocabularies of an emotion-set. For example, when it comes to defining "BigSix" as a value for "emotion-set" attribute of "Emotion Group" element, only acceptable values are: [anger, disgust, fear, happiness, sadness, surprise](refer to the Bix6 theory made by Paul Ekman) |
| Value | Describes a level of emotion as a result of measuring a user's emotional state. This value can be described based on normalizedRatioValueType. |
| Reliability | Describes a degree of reliability as a result of measuring a user's emotional state. A value of "reliability" must be a floating point number and cannot be lower than 0 or greater than 1. |
| EmotionSource | Describes modality through which an emotion is produced and what caused this emotion. |
| triggeredBy | Describes who and what caused an emotion. The emotion can be triggered by such a vehicle as persons, animals and media. |
| detectedFrom | Describes modality where an emotion is produced. A specific user emotion is usually detected through human's action and appearances such as face, gesture, voice, word, posture and electroencephalography EEG). |
| emotion-set | Describes which emotion vocabularies set shall be used to describe several emotion descriptions. It is possible to refer to a vocabulary defined in the same or in a separate document, through any URI. |

2.24. ScheduleType

This ScheduleType represents a plan for events related to a user. Social, religious, commercial or administrative events information can be described by ScheduleType. This type describes a combination of event, time and other information of schedule.

2.24.1. Syntax

```
<complexType name="ScheduleType">
    <complexContent>
        <extension base="ud:BaseUserType">
            <sequence>
                <element name="Event" type="mpeg7:EventType"/>
                <element name="SharedUser" type="mpeg7:UserIdentifierType" minOccurs="0" maxOccurs="unbounded"/>
                <element name="Time" type="ct:ExtendedTimeType"/>
            </sequence>
            <attribute name="descriptionMethod" use="optional">
                <simpleType>
                    restriction base="string">
                        <enumeration value="byUser"/>
                        <enumeration value="byMachine"/>
                        <enumeration value="byLearning"/>
                        <enumeration value="bySystem"/>
                        <enumeration value="byOthers"/>
                    </restriction>
                </simpleType>
            </attribute>
        </extension>
    </complexContent>
</complexType>
```

2.24.2. Semantics

Semantics of the ScheduleType:

| Name | Definition |
|---|---|
| ScheduleType | Represents a plan for events related to a user. Social, religious, commercial or administrative events information can be described by ScheduleType. This type describes a combination of event, time and other information of a schedule |
| Event | Describes an event about a specific schedule event. |
| Description | Describes a description giving additional information. |
| SharedUser | Indicates that which users can share a schedule information. |
| Time | Describes time information of a schedule. |
| descriptionMethod | Describes a method how an MPEG-UD document can acquire this schedule information. Schedule information can be described by a machine or by a system using an inference engine as well as by a user (default). In other words, some schedule descriptions can be automatically generated by analyzing a user's intention. In this case, this information may or may not be true. |

2.24.3. Examples

```
<ud:Schedule descriptionMethod="byLearning">
    <ud:Event>Meeting for Conference</ud:Event>
    <ud:SharedUser>ID_2013710475</ud:SharedUser>
    <ud:Time recurrence="daily" numOfRecurrences="10">
        <ct:startTime>2013-12-17T09:00:00Z</ct:startTime>
        <ct:endTime>2013-12-17T11:00:00Z</ct:endTime>
    </ud:Time>
</ud:Schedule>
```

2.25. ActivityType

This ActivityType describes behaviors such as running, walking, drinking, watching and so on.

2.25.1. Syntax

```
<complexType name="ActivityType">
    <complexContent>
        <extension base="ud:BaseUserType">
            <sequence>
                <element name="PeriodOfOccurrence" type="ct:TimeType"/>
                <element name="ActivityDescription" maxOccurs="unbounded">
                    <complexType>
                        <sequence minOccurs="0">
                            <element name="MovingSpeed" type="ct:valueByRatio" minOccurs="0"/>
                            <element name="Velocity" type="ct:valueByRatio"/>
                            <element name="Orientation" type="ct:valueByRatio"/>
                            <element name="Location" type="cd:LocationType" minOccurs="0"/>
                            <element name="PhysicalState" minOccurs="0">
                                <complexType>
                                    <sequence>
                                        <element name="RespirationRate" type="ct:valueByRatio" minOccurs="0"/>
                                    </sequence>
                                </complexType>
                            </element>
                        </sequence>
                    </complexType>
                </element>
            </sequence>
        </extension>
    </complexContent>
</complexType>
```

2.25.2. Semantics

Semantics of the ActivityType:

| Name | Definition |
|---|---|
| ActivityType | Describes behaviors such as running, walking, drinking, watching, and so on. |
| PeriodOfOccurrence | Describes a time point or interval of an activity. |
| Description | Describes additional Information of an activity. |
| ActivityItem | Describes an activity which a user did. |
| MovingSpeed | Describes a moving speed of a user. (m/s) |
| PhysicalState | Describes a physical state of a user. |
| Heartbeat | Indicates an heartbeat of a user |
| ECG | Indicates an ECG value of a user |
| RespirationRate | Indicates a respiration rate of a user |

2.25.3. Examples

```
<ud:Activity>
    <ud:PeriodOfOccurrence>
        <ct:startTime>2001-12-17T09:30:47Z</ct:startTime>
        <ct:duration>P1Y2M3DT10H30M</ct:duration>
    </ud:PeriodOfOccurrence>
    <ud:ActivityDescription>
        <ud:ActivityItem>running</ud:ActivityItem>
        <ud:MovingSpeed>35</ud:MovingSpeed>
        <ud:PhysicalState>
            <ud:Heartbeat>35</ud:Heartbeat>
            <ud:ECG>50</ud:ECG>
            <ud:RespirationRate>70</ud:RespirationRate>
        </ud:PhysicalState>
    </ud:ActivityDescription>
</ud:Activity>
```

2.26. IntentionType

The IntentionType describes the intention of the user.

2.26.1. Syntax

```
<complexType name="IntentionType">
    <sequence>
        <element name="IntentionDateTimeType" type="ct:TimeType" minOccurs="0"/>
        <element name="IntentionServiceType" type="sd:ServiceDescriptionType" minOccurs="0"/>
    </sequence>
    <attribute name="type">
        <simpleType>
            <restriction base="string">
                <enumeration value="going to"/>
            </restriction>
        </simpleType>
    </attribute>
</complexType>
```

2.26.2. Semantics

| Name | Definition |
|---|---|
| IntentionDateTimeType | This data describes time of an intention. |
| IntentionServiceType | Describes a service to be used by a user. |

<Appendix 2: Context Description>

1. Introduction

The following section includes a description of a schema used for describing a context.

2. Context Description Tools

2.1. ContextDescriptionType Data Type

This sub-clause describes a structure of a ContextDescriptionType data type. The ContextDescriptionType contains several elements, such as ValidTimeDuration, Season, DeviceCharacteristics, NetworkInfo, Location, Weather and OtherEnvironmentalInfo each of which is used for describing user's environmental information.

2.1.1. Syntax

```
<element name="CD" type="cd:ContextDescriptionType"/>
<complexType name="BaseContextType" abstract="true">
    <attribute name="InfoSource" type="anyURI"/>
</complexType>
<complexType name="ContextDescriptionType">
    <sequence minOccurs="0" maxOccurs="unbounded">
        <element name="ContextIdentification" type="cd:ContextIdentificationType" minOccurs="0"/>
        <element name="ValidTimeDuration" type="ct:TimeType" minOccurs="0"/>
        <element name="Season" type="cd:SeasonType" minOccurs="0"/>
        <element name="DeviceCharacteristics" type="cd:DeviceCharacteristicsType" minOccurs="0"
```

```
maxOccurs="unbounded"/>
            <element name="NetworkInfo"
type="cd:NetworkInfoType"
minOccurs="0" maxOccurs="unbounded"/>
            <element name="Location" type="cd:LocationType"
minOccurs="0"/>
            <element name="Weather" type="cd:WeatherType"
minOccurs="0"/>
            <element name="OtherEnvironmentalInfo"
type="cd:OtherEnvironmentalInfoType" minOccurs="0"/>
            <element name="Priority"
type="ct:ZeroToOnehundredOrdinalType" minOccurs="0"/>
            <any namespace="##other" id="Information"
minOccurs="0"/>
        </sequence>
        <attributeGroup ref="ct:commonAttributes"/>
    </complexType>
```

2.1.2. Semantics

Semantics of the ContextDescriptionType:

| Name | Definition |
| --- | --- |
| CD | This data element is a root element of Context Description. |
| ContextDescription Type | This data type contains static and dynamic information around a user. |
| ValidTimeDuration | Describes a valid time duration for context description. A syntax and semantics of PeriodOfTimeType are specified in Common Type (M32384). |
| Season | Specifies a current season when a service is requested. |
| DeviceCharacteristics | Describes general characteristics of a terminal. |
| NetworkInfo | Describes network related information. |
| Location | Describes a current location when a service is requested. A syntax and semantics of PlaceType are specified in ISO/IEC 15938-5. |
| Weather | Describes current weather when a service is requested. |
| OtherEnvironmentalInfo | Describes environmental information of noise or illumination characteristics around a user. |
| Priority | Describes a priority of CD. |
| commonAttributes | Describes a group of attributes for commonAttributes. A syntax and semantics of commonAttributes are specified in Common Type (M32384). |

2.1.3. Examples

This example shows a ContextDescriptionType data type.

```
<CD userID="ID_2013710471">
    <cd:ValidTimeDuration>
        <ct:startTime>2014-01-03109:00:00Z</ct:startTime>
        <ct:endTime>2014-01-03T10:00:00Z</ct:endTime>
    </cd:ValidTimeDuration>
    <cd:Season>winter</cd:Season>
    <cd:DeviceCharacteristics deviceID="Phone" inUse="true"
availablity="true">
        <cd:DeviceCapability xsi:type="mpeg21:DisplaysType">
            <mpeg21:Display>
                <mpeg21:DisplayCapability
xsi:type="mpeg21:DisplayCapabilityType">
                    <mpeg21:Mode>
                        <mpeg21:Resolution horizontal="720"
vertical="480"/>
                    </mpeg21:Mode>
                </mpeg21:DisplayCapability>
            </mpeg21:Display>
        </cd:DeviceCapability>
        <cd:NetworkInterfaceUnit id="ID_2"
            minGuaranteed="32000"
maxCapacity="384000"/>
    </cd:DeviceCharacteristics>
    <cd:Weather>
        <cd:Precipitation value="10.0" duration="1"
formation="Snowflakes"/>
    </cd:Weather>
</CD>
```

2.2. ContexIdentificationType

This sub-clause describes a structure of ContextIdentificationType.

2.2.1. Syntax

```
<!--
####################################################### -->
<!-- Definition of Context Identification type       -->
<!--
####################################################### -->
<complexType name="ContextIdentificationType">
    <sequence>
        <element name="InstanceIdentifier"
            type="mpeg7:UniqueIDType"/>
        <element name="sessionID" type="URI"/>
    </sequence>
</complexType>
```

2.2.2. Semantics

Semantics of the ContextDescriptionType:

| Name | Definition |
| --- | --- |
| ContextIdentification | Complex type describing a context ID |
| InstanceIdentifier | An element describing an ID of a context |
| sessionID | An element describing a session ID used by a context |

2.3. SeasonType

The Season describes a current season which is defined as spring, summer, autumn, winter. Each season is divided by three categories, for example, early, middle, and late. Hence there are total 12 seasons.

2.3.1. Syntax

```
<simpleType name="SeasonType">
    <restriction base="string">
        <enumeration value="early spring"/>
        <enumeration value="spring"/>
        <enumeration value="late spring"/>
        <enumeration value="early summer"/>
        <enumeration value="summer"/>
        <enumeration value="late summer"/>
        <enumeration value="early autumn"/>
        <enumeration value="autumn"/>
        <enumeration value="late autumn"/>
        <enumeration value="early winter"/>
        <enumeration value="winter"/>
        <enumeration value="late winter"/>
    </restriction>
</simpleType>
```

2.3.2. Examples

This example indicates a winter season.

`<cd:Season>winter</cd:Season>`

2.4. DeviceCharacteristics

This sub-clauses describe a static and dynamic information of a device.

The information may include device information which does not change in time, unless a user intentionally change, such as a type of device, maker, network service provider, etc. Additionally, the information may include dynamic information such as a battery level, an available memory size, a CPU utilization level, and an available device's network unit.

2.4.1. Syntax

```
<complexType name="DeviceCharacteristicsType">
    <complexContent>
        <extension base="cd:BaseContextType">
            <sequence>
                <element name="DeviceCapability" type="mpeg21:TerminalCapabilityBaseType" minOccurs="0" maxOccurs="unbounded"/>
                <element name="NetworkInterfaceUnit" type="mpeg21:NetworkCapabilityType" minOccurs="0" maxOccurs="unbounded"/>
            </sequence>
            <attribute name="deviceID" type="ID" use="required"/>
            <attribute name="availablity" type="boolean" default="true"/>
            <attribute name="inUse" type="boolean" default="false"/>
            <attribute name="operatingSystem" type="string"/>
            <attribute name="version" type="string"/>
        </extension>
    </complexContent>
</complexType>
```

2.4.2. Semantics

Semantics of DeviceCharacteristicsType:

| Name | Definition |
| --- | --- |
| DeviceCharacteristicsType | This data type describes general characteristics of a terminal. |
| DeviceCapability | Describes capabilities of a terminal in terms of input-output capabilities and device properties. A syntax and semantics of TerminalCapabilityBaseType are specified in ISO/IEC 21000-7. |
| NetworkInterfaceUnit | Describes a device's network unit. A syntax and semantics of NetworkCapabilityType are specified in ISO/IEC 21000-7. |
| deviceID | Specifies an unique device identifier. |
| Availability | Specifies availability of a device. |
| inUse | Specifies whether a device is currently in use. |
| operatingSystem | Describes an operating system used by a device |
| Version | Describes a version of an operating system/device |

2.4.3. Examples

This example describes a terminal's display resolution that 720×480 using mpeg-21:DisplaysType. Also this description indicates that a maximum capacity of 384 kbps and a minimum guaranteed bandwidth of 32 kbps.

```
<cd:DeviceCapability xsi:type="mpeg21:DisplaysType">
    <mpeg21:Display>
        <mpeg21:DisplayCapability xsi:type="mpeg21:DisplayCapabilityType">
            <mpeg21:Mode>
                <mpeg21:Resolution horizontal="720" vertical="480"/>
            </mpeg21:Mode>
        </mpeg21:DisplayCapability>
    </mpeg21:Display>
</cd:DeviceCapability>
<cd:NetworkInterfaceUnit id="ID_5" minGuaranteed="32000" maxCapacity="384000"/>
</cd:DeviceCharacteristics>
```

2.5. NetworkInfoType

This sub-clause describes a structure of a NetworkInfo element. NetworkInfoType describes a static and dynamic information of an available network around a user.

2.5.1. Syntax

```
<complexType name="NetworkInfoType">
    <complexContent>
        <extension base="cd:BaseContextType">
            <sequence>
                <element name="NetworkCapability" type="mpeg21:NetworkCapabilityType"/>
                <element name="NetworkCondition" type="mpeg21:NetworkConditionType"/>
            </sequence>
            <attribute name="networkID" type="ID"/>
            <attribute name="InUse" type="boolean"/>
        </extension>
    </complexContent>
</complexType>
```

2.5.2. Semantics

Semantics of the NetworkInfoType:

| Name | Definition |
|---|---|
| NetworkInfoType | This data type describes static and dynamic information of a network around a user. |
| NetworkCapability | Describes static information of network around a user. A syntax and semantics of NetworkCapabilityType are specified in ISO/IEC 21000-7. |
| NetworkCondition | Describes dynamic information for a network around a user. A syntax and semantics of NetworkConditionType are specified in ISO/IEC 21000-7. |
| Networked | Specifies a unique network identifier. |
| InUse | Specifies whether a device is currently in use. |

2.5.3. Examples

This example describes a network that is characterized by a maximum capacity of 384 kbps and a minimum guaranteed bandwidth of 32 kbps. This description indicates that a maximum bandwidth achieved was 256 kbps and an average over that time was 80 kbps.

```
<cd:NetworkInfo networkID="wifi_1" InUse="true">
    <cd:NetworkCapability
        xsi:type="mpeg21:NetworkCapabilityType"
minGuaranteed="32000" maxCapacity="384000"/>
    <cd:NetworkCondition
        xsi:type="mpeg21:NetworkConditionType"
duration="PT330N1000F">
        <mpeg21:AvailableBandwidth average="80000"
maximum="256000"/>
```

-continued

```
        <mpeg21:Delay packetTwoWay="330"
            delayVariation="66"/>
        <mpeg21:Error packetLossRate="0.05"/>
    </cd:NetworkCondition>
</cd:NetworkInfo>
```

2.6. LocationType

This sub-clause describes a structure of a Location element. Location includes Location and SemanticLocation elements.

2.6.1. Syntax

```
<complexType name="LocationType">
    <sequence>
        <element name="Location" type="mpeg7:PlaceType"
minOccurs="0"/>
        <element name="SemanticLocation"
type="mpeg7:SemanticPlaceType" minOccurs="0"/>
    </sequence>
</complexType>
```

2.6.2. Semantics

Semantics of the LocationType:

| Name | Definition |
|---|---|
| LocationType | This data type represents a geographical and semantic location of a user. |
| Location | Describes a user's geographical location. |
| SemanticLocation | Describes a semantic location of a user. |

2.6.3. Examples

This example indicated use of Location. In this case, the place is a university in Madrid, Spain.

```
<cd:Location>
    <mpeg7:Name xml:lang="en">Madrid</mpeg7:Name>
    <mpeg7:GeographicPosition datum="itrf">
        <mpeg7:Point latitude="35.5" longitude="135.75" altitude="100"/>
    </mpeg7:GeographicPosition>
    <mpeg7:AdministrativeUnit
type="city">Madrid</mpeg7:AdministrativeUnit>
    <mpeg7:PostalAddress>
        <mpeg7:AddressLine>E.T.S.Ing.
Telecommunication</mpeg7:AddressLine>
        <mpeg7:AddressLine>Universidad Politecnica de
Madrid</mpeg7:AddressLine>
        <mpeg7:AddressLine>Ciudad Universitaria
s/n</mpeg7:AddressLine>
        <mpeg7:PostingIdentifier>E-2804</mpeg7:PostingIdentifier>
    </mpeg7:Postal Address>
    <mpeg7:InternalCoordinates>C-306</mpeg7:InternalCoordinates>
</cd:Location>
```

2.7. WeatherType

This sub-clause describes a structure of a weather element. WeatherType includes Temperature, Precipitation, wind and Humidity elements.

2.7.1. Syntax

```
<complexType name="WeatherType">
    <complexContent>
        <extension base="cd:BaseContextType">
            <sequence>
                <element name="Temperature"
```

-continued

```
type="mpegVsiv:TemperatureSensorType" minOccurs="0"/>
                <element name="Precipitation" minOccurs="0">
                    <complexType>
                        <attribute name="value" type="float"/>
                        <attribute name="valueUnit" type="mpegVct:unitType"/>
                        <attribute name="duration" type="integer"/>
                        <attribute name="durationUnit" type="mpegVct:unitType"/>
                        <attribute name="formation">
                            <simpleType>
                                <restriction base="string">
                                    <enumeration value="Raindrops"/>
                                    <enumeration value="Ice pellets"/>
                                    <enumeration value="Hail"/>
                                    <enumeration value="Snowflakes"/>
                                </restriction>
                            </simpleType>
                        </attribute>
                    </complexType>
                </element>
                <element name="Wind" minOccurs="0">
                    <complexType>
                        <complexContent>
                            <extension base="mpegVsiv:VelocitySensorType">
                                <attribute name="direction" type="mpeg7:termReferenceType"/>
                            </extension>
                        </complexContent>
                    </complexType>
                </element>
                <element name="Humidity" type="mpegVsiv:HumiditySensorType" minOccurs="0"/>
            </sequence>
        </extension>
    </complexContent>
</complexType>
```

2.7.2. Semantics

Semantics of the WeatherType:

| Name | Definition |
|---|---|
| Precipitation | Describes precipitation during a specified period of time as defined by a duration attribute in a default unit of millimeter or in a unit specified by a valueUnit attribute. |
| Value | Specifies precipitation in a default unit of millimeter or in a unit specified by a valueUnit attribute. |
| valueUnit | Specifies a unit of a precipitation value, if a unit other than a default unit is used, as a reference to a classification scheme term provided by UnitTypeCS defined in A.2.1 of ISO/IEC 23005-6 using the mpeg7: termReferenceType defined in 7.6 of ISO/IEC 15938-5. |
| Duration | Specifies a time period up to a time of measuring precipitation in a default unit of hour or in a unit specified by a durationUnit attribute. |
| durationUnit | Specifies a unit of a duration, if a unit other than a default unit is used, as a reference to a classification scheme term provided by UnitTypeCS defined in A.2.1 of ISO/IEC 23005-6 using the mpeg7: termReferenceType defined in 7.6 of ISO/IEC 15938-5. |
| Formation | Specifies a formation of precipitation. |
| Wind | Describes a strength and direction of wind. A syntax and semantics of VelocitySensorType are specified in ISO/IEC 23005-5. |
| Direction | Specifies a direction of wind coming from, as a reference to a classification scheme term provided by WindDirectionTypeCS defined in Annex B.8 using the mpeg7: termReferenceType defined in 7.6 of ISO/IEC 15938-5. |
| Humidity | Describes humidity. A syntax and semantics of HumiditySensorType are specified in ISO/IEC 23005-5. |

2.7.3. Examples

This example indicates a snowing 10 centimeter per hour.

```
<cd:Weather>
    <cd:Precipitation value="10.0" valueUnit="centimeter" duration="1" formation="Snowflakes"/>
</cd:Weather>
```

2.8. OtherEnvironmentalInfo

This sub-clause describes a structure of an OtherEnvironmentalInfo element. OtherEnvironmentalInfoType includes AudioEnvironment and IlluminationCharacteristicsics elements.

2.8.1. Syntax

```
<complexType name="OtherEnvironmentalInfoType">
    <complexContent>
        <extension base="cd:BaseContextType">
            <sequence>
                <element name="AudioEnvironment" type="mpeg21:AudioEnvironmentType" minOccurs="0"/>
                <element name="IlluminationCharacteristics" type="mpeg21:IlluminationCharacteristicsType" minOccurs="0"/>
            </sequence>
        </extension>
    </complexContent>
</complexType>
```

2.8.2. Semantics

Semantics of the OtherEnvironmentalInfoType:

| Name | Definition |
|---|---|
| OtherEnvironmentalInfoType | Describes characteristics that pertain to audio-visual aspects. |
| AudioEnvironment | Describes a natural audio environment of a particular user. A syntax and semantics of AudioEnvironmentType are specified in ISO/IEC 21000-7. |
| IlluminationCharacteristics | Describes overall illumination characteristics of a natural environment. A syntax and semantics of IlluminationCharacteristicsType are specified in ISO/IEC 21000-7. |

2.8.3. Examples

This example describes AudioEnvironment and IlluminationCharacteristics. AudioEnvironment indicates that an environmental noise level is 20 dB. IlluminationCharacteristics indicates a correlated color temperature.

```
<cd:OtherEnvironmentalInfo>
    <cd:AudioEnvironment>
        <mpeg21:NoiseLevel>20</mpeg21:NoiseLevel>
        <mpeg21:NoiseFrequencySpectrum>
            40 30 20 10 10 10 10 10 10 10
            10 40 40 40 30 30 30 20 20 20
            10 10 10 10 10 10 10 10 10 10
            10 10 10
        </mpeg21:NoiseFrequencySpectrum>
    </cd:AudioEnvironment>
</cd:OtherEnvironmentalInfo>
<cd:OtherEnvironmentalInfo>
    <cd:IlluminationCharacteristics>
        <mpeg21:TypeOfIllumination>
<mpeg21:ColorTemperature>159</mpeg21:ColorTemperature>
        </mpeg21:TypeOfIllumination>
        <mpeg21:Illuminance>500</mpeg21:Illuminance>
    </cd:IlluminationCharacteristics>
</cd:OtherEnvironmentalInfo>
```

<Appendix 3: Service Description>

DecisionModelType in Service Description (SD)

It might be an ultimate purpose of a service provider that users are satisfied with its service and aware of its intention efficiently. We provide a decision making model to describe an intention of a specific service provider. Decision making can be regarded as a cognitive process resulting in a selection of a course of action among several alternative scenarios. Every decision making process produces a final choice which can be an action or an opinion of choice [1]. Each service provider has own domain knowledge about every phase of its business, and needs to make distinct strategies to try to develop into a highly profitable business. For this, it might be important for a service provider to segment users considering usage data and a statistical analysis of users for providing target services.

First of all, we propose an approach that describes a decision tree to represent a decision making model in this document. As mentioned in an earlier document [2], we propose a structure of an SD and the second part in the SD is a service target description. Since one of purposes of a recommended description (RD) is to suggest a proper service according to a user's intention, the SD shall describe its service target in its description. In this element, we newly define a DecisionModel child element which includes information about a decision model uniquely made by a specific service provider.

Syntax

```
<element name="DecisionModel" minOccurs="0"
type="sd:DecisionModelType" maxOccurs="unbounded"/>
    <complexType name="DecisionModelType">
        <sequence>
            <element name="DecisionTree" minOccurs="0"
maxOccurs="unbounded">
                <complexType>
                    <attribute name="userType" type="token"
use="required"/>
                </complexType>
            </element>
            <element name="UserTypeSet"
type="sd:VocabularySetType">
                <unique name="userType-vocabulary">
                    <selector xpath="sd:vocabulary"/>
                    <field xpath="@name"/>
                </unique>
            </element>
        </sequence>
    </complexType>
<complexType name="VocabularySetType">
    <sequence>
```

```
        <element name="vocabulary" maxOccurs="unbounded">
            <complexType>
                <attribute name="name" type="NMTOKEN"
use="required"/>
            </complexType>
        </element>
    </sequence>
    <attribute name="id" type="ID" use="required"/>
</complexType>
```

Semantics
Semantics of the DecisionModel:

| Name | Definition |
|---|---|
| DecisionModel | Describes a decision model which has an informational role of user segmentation. |
| DecisionModelType | Describes a decision model for each user type and defines a vocabularies set of a user type. |
| DecisionTree | Describes a decision tree model representing a specific user type. (TBC) |
| userType | Indicates a specific user type related to a decision tree. |
| UserTypeSet | Describes a set of user-type vocabularies. Only vocabulary names defined in a declared user type set of a given element can be used for representations of userType. |

Example

```
<sd:ServiceTargetInformation>
    <sd:Decision Model>
        <sd:DecisionTree userType="UserType_1">
            <!-- UserType 1 modeling -->
        </sd:DecisionTree>
        <sd:UserTypeSet id="ID_UserTypeSet1" >
            <sd:vocabulary name="UserType_1"/>
            <sd:vocabulary name="UserType_2"/>
            <sd:vocabulary name="UserType_3"/>
            <sd:vocabulary name="UserType_4"/>
        </sd:UserTypeSet>
    </sd:Decision Model>
    <sd:Decision Model>
        <sd:UserTypeSet id="ID_InclinationOfPolitics">
            <sd:vocabulary name="progressiveTendency"/>
            <sd:vocabulary name="conservativeTendency"/>
        </sd:UserTypeSet>
    </sd:Decision Model>
</sd:ServiceTargetInformation>
```

<Appendix 4: Recommendation Description>

UserType Description in Recommendation Description (RD)

The type and tendency information about a user can be described in an RD. This information can be obtained from an RD engine. There are two ways to take user type information. The first way to take related data is to get results from an RD engine using a UD and a CD directly. In this case, the RD engine should have an inference module to analyze a context of a user. However, it is not easy to develop an inference engine providing the best solution for every case and every application. The second way is just to interpret rules and relations of an SD using contexts of the UD and the CD. After that, a proper user type may be found and transmitted to an application. The first requirement for this case is that an RD engine can analyze a rule of decision tree description in the SD. A proper user type can be found using user's contexts in the UD and the CD and easily compatible with applications. In this case, the RD engine needs not to have an ability to deduce.

Syntax

```
<element name="RD" type="ud:recommendationDescriptionType"/>
<complexType name="recommendationDescriptionType">
    <sequence>
        <element name="CompactUsageDescription"
            type="rd:compactUsageDescriptionType" minOccurs="0"
            maxOccurs="unbounded"/>
        <element name="QueryDescription"
            type="rd:queryDescriptionType" minOccurs="0"
            maxOccurs="unbounded"/>
        <element name="userType" type="NMTOKEN"
            minOccurs="0"
            maxOccurs="unbounded"/>
    </sequence>
    <attributeGroup ref="ct:commonAttributes"/>
</complexType>
<complexType name="compactUsageDescriptionType"/>
<complexType name="queryDescriptionType"/>
```

Semantics

| Name | Definition |
| --- | --- |
| commonAttributes | Indicates properties of each sub-element. |
| userType | Indicates userType for a specific service. |

Example
```
<rd:RD userID="ID_1">
    <rd:CompactUsageDescription/>
    <rd:QueryDescription/>
    <rd:userType>UserType_4</rd:userType>
    <rd:userType>conservativeTendency</rd:userType>
</rd:RD>
```

What is claimed is:

1. A context based system comprising:
a user description manager; and
a user terminal connected to the user description manager, wherein the user description manager is configured to:
   generate a user profile about at least one entity through the user terminal;
   provide user profile characteristic information obtained or inferred from the user terminal associated with the at least one entity; and
   generate a user description based on the user profile and the user profile characteristic information to provide the user description to a recommendation engine performing a service recommendation according to a situation of the at least one entity for a required service if a recommendation of a context based service is required for the at least one entity,
   wherein generating the user profile comprises generating a corresponding user profile through a user terminal associated with other entity included in a plurality of heterogeneous entities or an external entity other than the plurality of the heterogeneous entities for a part of the plurality of the heterogeneous entities when the at least one entity comprises the plurality of the heterogeneous entities, and
wherein the user profile characteristic information comprises:
   (1) a user usage history representing an action history on a specific domain for the at least one entity, wherein the action history comprises at least one of a content usage history, website usage pattern, and purchase record;
   (2) a user preference comprising content consumption information by the at least one entity, wherein the content consumption information comprises a filtering, searching or reading record for a content;
   (3) at least one of an audio presentation preference related to an audio play, a display presentation preference related to an image display, and a graphic presentation preference related to a graphic media expression according to the required service;
   (4) a user emotion included in an emotion word set and generated based on input data directly inputted by the at least one entity or inference data inferred through sensing by the user terminal; and
   (5) a user emotion group comprising a user emotion status of the at least one entity generated during a specific period, the user emotion status being defined as an emotion set representing a mixed emotion.

2. A context based system comprising:
a user description manager; and
a user terminal connected to the user description manager, wherein the user terminal is configured to receive a user description generated by the user description manager based on a user profile and user profile characteristic information if a recommendation of a context based service is required for at least one entity, and
wherein the user description manager configured to perform a service recommendation according to a situation of the at least one entity for a service required based on the user description and generate the user profile, and
wherein generating the user profile comprises generating the user profile with respect to the at least one entity through the user terminal and the user profile characteristic information being obtained or inferred from the user terminal associated with the at least one entity, and generating a corresponding user profile through a user terminal associated with other entity included in a plurality of heterogeneous entities or an external entity other than the plurality of the heterogeneous entities for a part of the plurality of the heterogeneous entities when the at least one entity comprises the plurality of the heterogeneous entities,
wherein the user profile characteristic information comprises:
   (1) a user usage history representing an action history on a specific domain for the at least one entity, wherein the action history comprises at least one of a content usage history, website usage pattern and purchase record;
   (2) a user preference comprising content consumption information by the at least one entity, wherein the content consumption information comprises a filtering, searching or reading record for a content;
   (3) at least one of an audio presentation preference related to an audio play, a display presentation preference related to an image display, and a graphic presentation preference related to a graphic media expression according to the required service;
   (4) a user emotion included in an emotion word set and generated based on input data directly inputted by the at least one entity or inference data inferred through sensing by the user terminal; and
   (5) a user emotion group comprising a user emotion status of the at least one entity generated during a specific period, the user emotion status being defined as an emotion set representing a mixed emotion.

* * * * *